United States Patent [19]
Yoshiike et al.

[11] Patent Number: 5,528,038
[45] Date of Patent: Jun. 18, 1996

[54] TEMPERATURE DISTRIBUTION MEASUREMENT APPARATUS AND ITS APPLICATION TO A HUMAN BODY DETECTING SYSTEM

[75] Inventors: Nobuyuki Yoshiike, Ikoma; Koji Arita; Susumu Kobayashi, both of Osaka, all of Japan

[73] Assignee: Matsushita Electric Industrial Co., Ltd., Osaka, Japan

[21] Appl. No.: 232,857

[22] Filed: Apr. 22, 1994

Related U.S. Application Data

[63] Continuation of Ser. No. 880,067, May 7, 1992.

[30] Foreign Application Priority Data

| May 7, 1991 | [JP] | Japan | 3-101304 |
| May 28, 1991 | [JP] | Japan | 3-123496 |
| Jun. 25, 1991 | [JP] | Japan | 3-152983 |
| Jul. 9, 1991 | [JP] | Japan | 3-168487 |
| Jul. 9, 1991 | [JP] | Japan | 3-168488 |

[51] Int. Cl.[6] ................................. G01J 5/00
[52] U.S. Cl. ..................... 250/342; 250/338.3
[58] Field of Search ................... 250/342, 334, 250/338.3

[56] References Cited

U.S. PATENT DOCUMENTS

| 4,072,863 | 2/1978 | Roundy | 250/332 |
| 4,556,796 | 12/1985 | Renals | 250/338.3 |
| 4,973,843 | 11/1990 | Murata et al. | 250/338.3 |
| 5,008,522 | 4/1991 | Lundin | 250/203.6 |
| 5,045,699 | 9/1991 | Schulze et al. | 250/330 |

FOREIGN PATENT DOCUMENTS

| 57-124981 | 8/1982 | Japan. | |
| 57-175931 | 10/1982 | Japan | 250/338.3 |
| 60-56229 | 4/1985 | Japan. | |
| 61-186826 | 8/1986 | Japan. | |
| 61-290330 | 12/1986 | Japan. | |
| 1-185420 | 7/1989 | Japan | 250/351 |
| 2105460 | 3/1983 | United Kingdom | 250/338.3 |

*Primary Examiner*—Constantine Hannaher
*Attorney, Agent, or Firm*—Ratner & Prestia

[57] ABSTRACT

A temperature distribution measurement apparatus has an infrared array sensor that includes a pyroelectric substrate with infrared array receiving electrodes and electrodes for compensation formed on its front side and opposing electrodes formed on its backside. Also included is an infrared lens to focus incident infrared lights on the array sensor, a chopper to cut off the incident infrared rays intermittently and a rotating part carrying and rotating parts of the apparatus. The detector elements of the infrared array sensor are laid out vertically and parallel with one another. A horizontal temperature distribution is measured by a lateral scanning with the rotating part rotating horizontally while a vertical temperature distribution is measured by driving the chopper in front of the infrared sensor. Thus, a two dimensional temperature distribution of an empty space is measured. The number and the position of persons in the empty space attained from the temperature distribution measurement data is useful for controlling air conditioners.

10 Claims, 22 Drawing Sheets

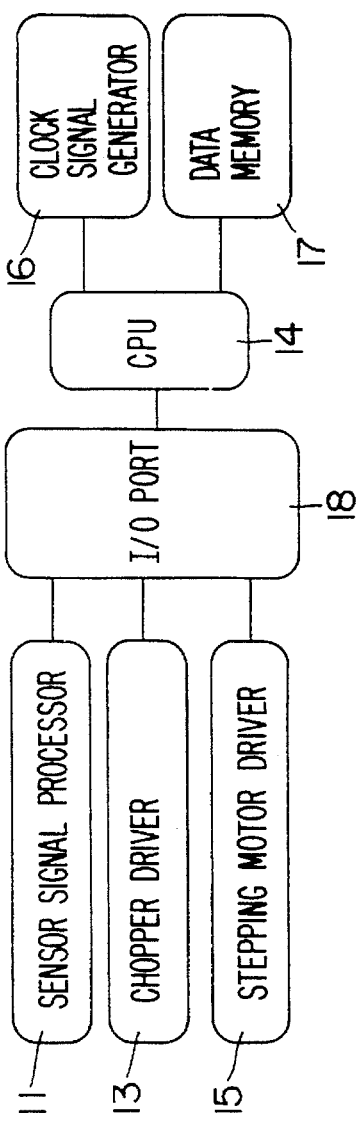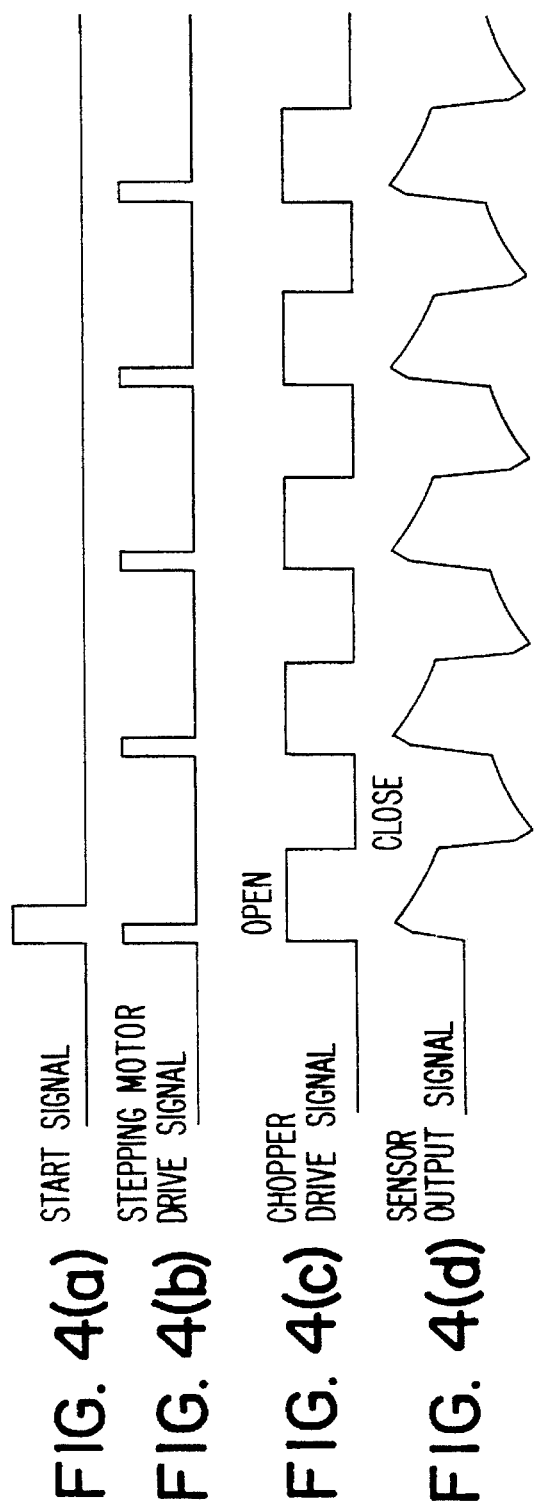
FIG. 3
FIG. 4(a) START SIGNAL
FIG. 4(b) STEPPING MOTOR DRIVE SIGNAL
FIG. 4(c) CHOPPER DRIVE SIGNAL
FIG. 4(d) SENSOR OUTPUT SIGNAL

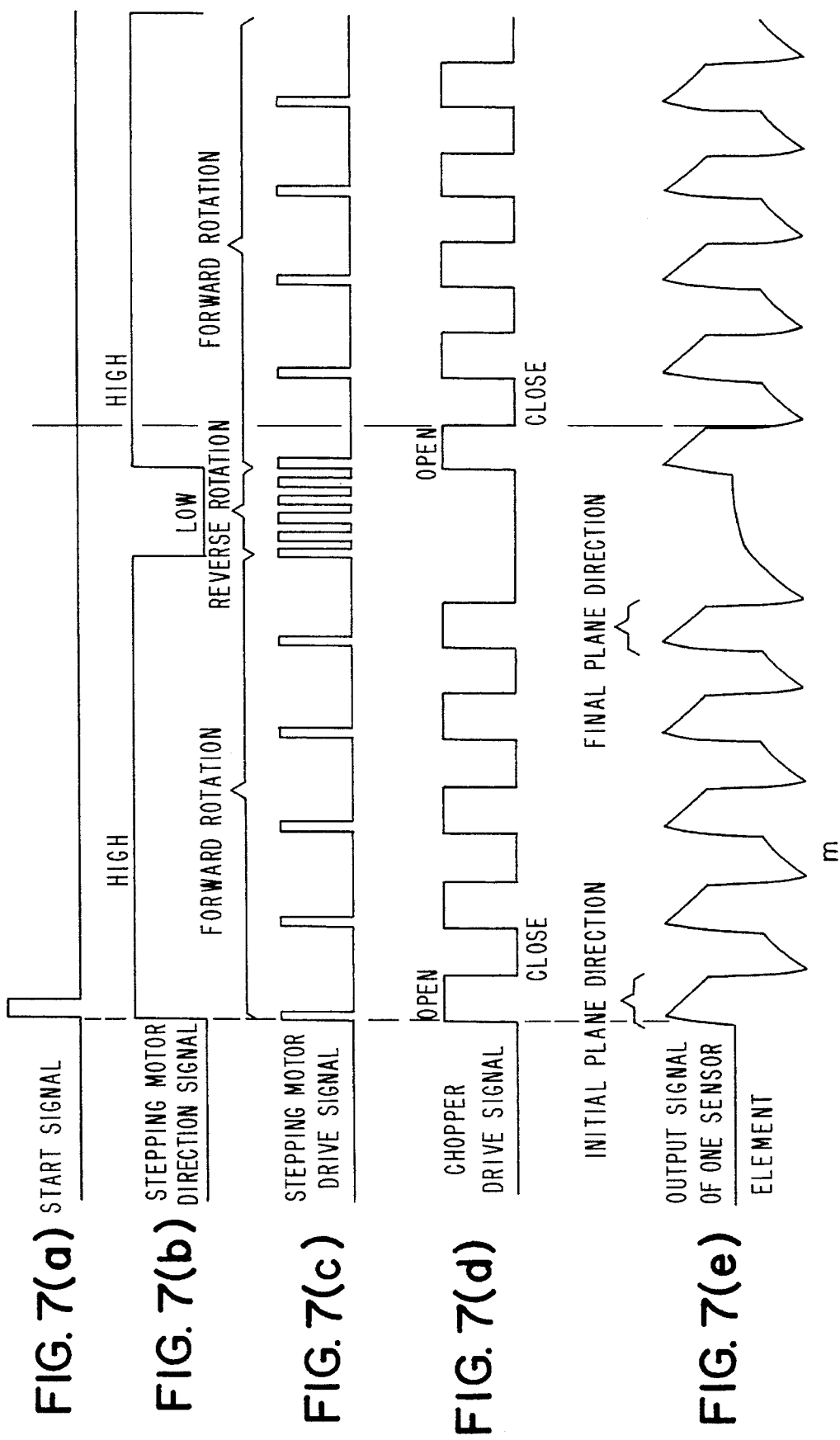

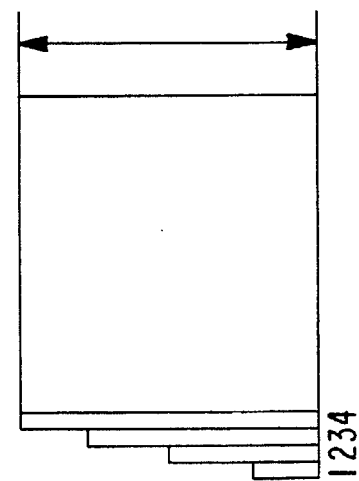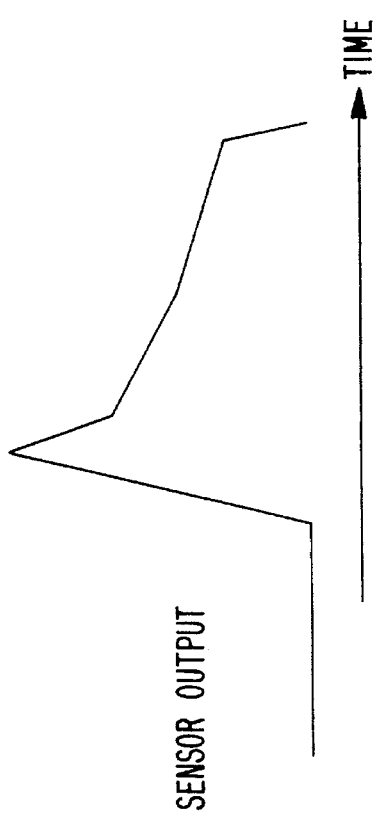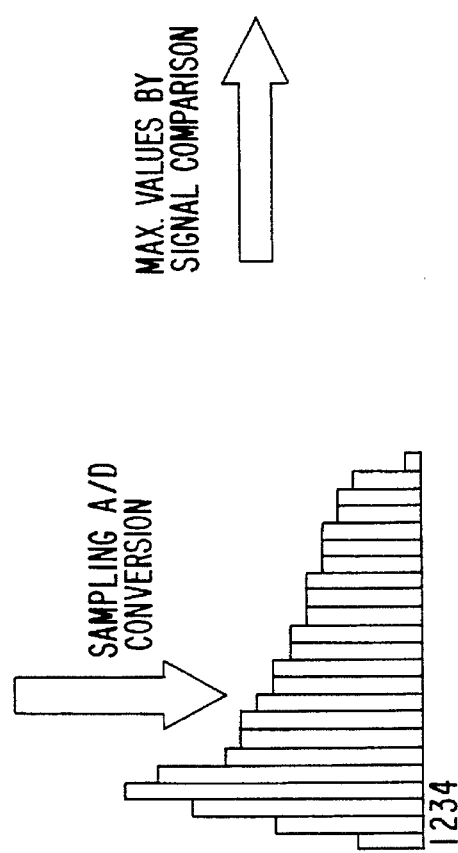
FIG. 26(a)
FIG. 26(b)
FIG. 26(c)

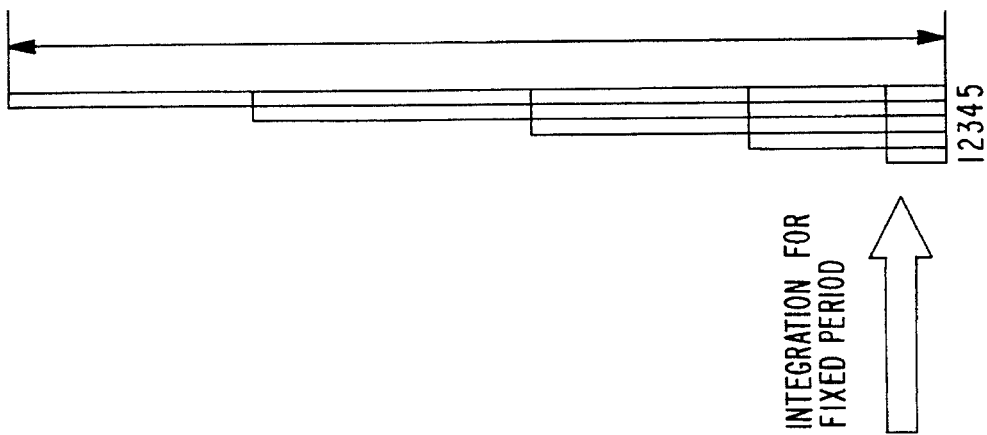
FIG.27(c)
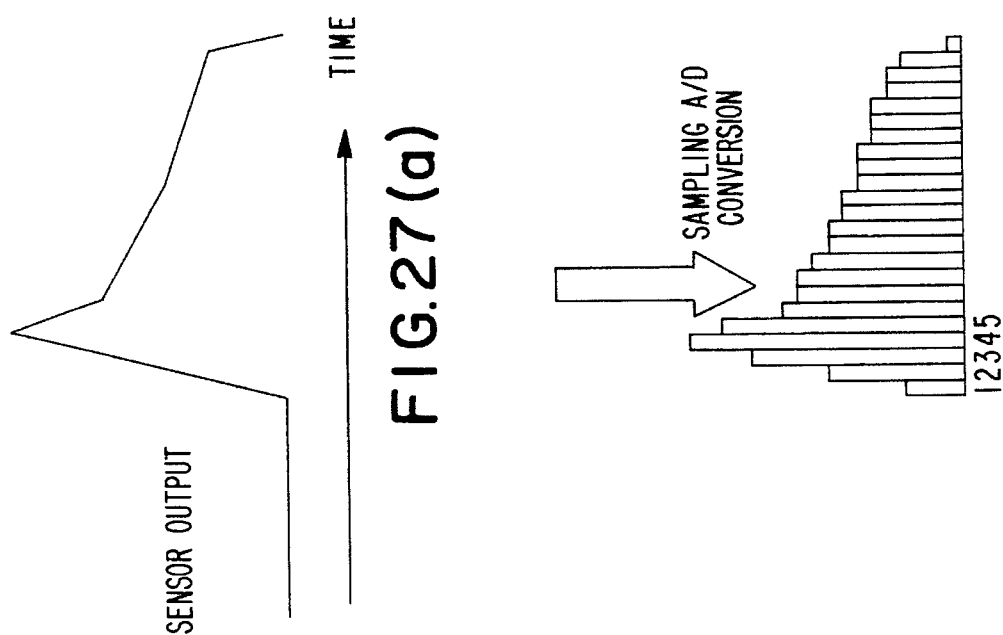
FIG.27(a)
FIG.27(b)

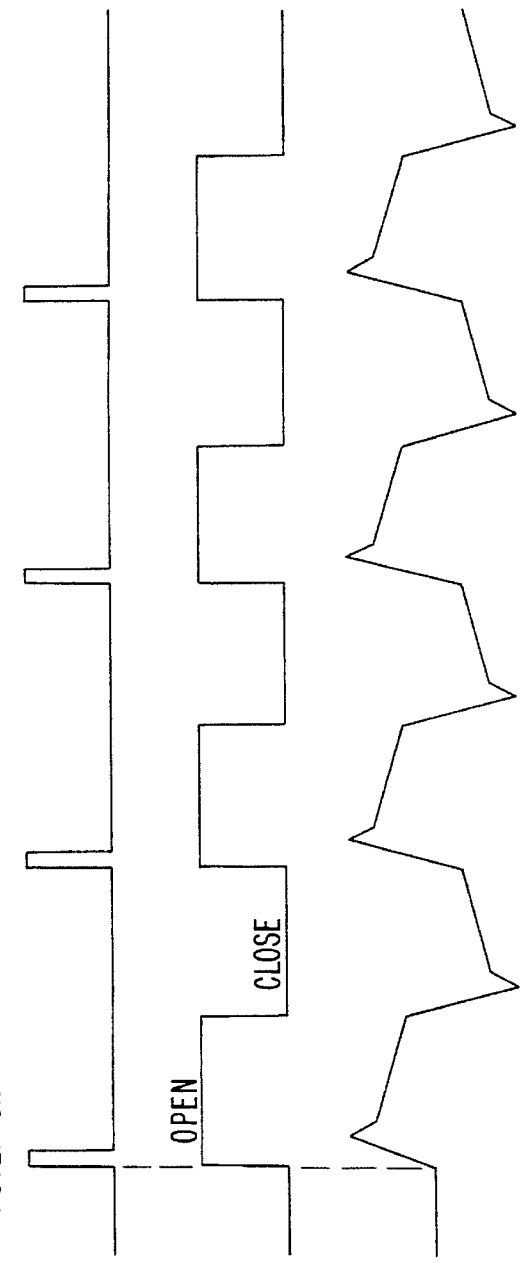

TEMPERATURE DISTRIBUTION MEASUREMENT APPARATUS AND ITS APPLICATION TO A HUMAN BODY DETECTING SYSTEM

This application is a continuation of application Ser. No. 07/880,067 filed May 7, 1992.

FIELD OF THE INVENTION

This invention relates to a temperature radiation distribution measurement apparatus that utilizes a pyroelectric type infrared sensor and its application to a human body detecting system.

BACKGROUND OF THE INVENTION

In recent years there has been a mounting demand for measurement of the room temperature distribution to detect the presence of human beings and their motion in a room in connection with security maintenance and air conditioning.

So far, there have been several methods that utilize infrared radiation in measuring the temperature distribution in an empty space, one being an application of two dimensional quantum effect type solid-state infrared image sensors and another being an application of pyroelectric infrared sensors.

In case of the quantum effect type sensors, a high accuracy in temperature measurement and a high resolution are achieved but the cooling system required by the sensors is too costly for their use with home appliances.

With regard to the method of using pyroelectric sensors in measuring the space temperature distribution, there is a method to find the temperature distribution by detecting the input energy of one direction after another through a single unit of a pyroelectric sensor that performs a directional scanning vertically as well as horizontally as disclosed in TOKUKAI-SHOW 64-88391, TOKUKAI-SHOW 57-185695, TOKUKAI-HEI 2-183752, TOKUKAI-HEI 2-196932, etc.

A pyroelectric sensor is capable of detecting infrared radiations and the thermal radiations in particular. It comprises two electrodes mounted on the both sides of a pyroelectric substrate which changes the electric potential across the two electrodes upon application of infrared radiations to it. For such a pyroelectric substrate, ferroelectric materials of glycine sulfate, polyvinylidene fluoride, $LiTaO_3$, etc. are used as the raw materials. The ferroelectric materials of glycine sulfate, $LiTaO_3$ and the like are used in a crystalline form and the one of $PbTiO_3$ is used usually in the form of sintered ceramics or thin film prepared by a thin film technology since its crystallization is not easy.

The thin film sensor has high cost and reliability problems, but in contrast, the sensors of crystalline and ceramics have the features of excellent productivity and reliability. These crystalline or ceramic bodies are sliced and polished to thin plates to make sensor substrates. Over the outer surface of the substrates, electrodes are formed to complete an array sensor by having a series of sensor elements aligned on the substrates.

However, this array sensor had the problem of its output voltage changing sensitively against the temperature change and the vibration of the substrates.

SUMMARY OF THE INVENTION

This invention comprises an array sensor to detect infrared radiations, a focusing means composed of infrared lenses to focus infrared radiations on the array sensor, a chopping means that intermittently shields the incident infrared rays (together with a rotating part) and a driving means that rotates the rotating part in the direction of the shorter axis of the array sensor. The above set-up may be applied to a human body detecting system.

The foregoing set-up of this invention is capable of detecting the temperature distribution in a fixed area along the longer axis of the sensor array by means of the integrated rotating part. The set-up is additionally capable of measuring the two-dimensional temperature distribution of an empty space by the rotation of the rotating part in the direction of the shorter axis of the sensor array.

From the measurement data taken on the radiant temperature distribution by the above set-up of temperature distribution measurement apparatus of this invention, information as to the number and the position of persons in the space of a room is made possible to obtain. Furthermore, their movement in the room can be studied qualitatively with the additional data on changes of the temperature distribution by the lapse of time.

Also, the temperature distribution measurement apparatus of this invention is equipped with a stepping motor that rotates the receiving plane of the infrared array sensor in steps. After a measurement of the sensor output with the sensor plane set in a certain direction, the stepping motor rotates the sensor plane by one step corresponding to a certain fixed angle. This process is repeated until the sensor plane finishes its rotation covering the ranges set in the beginning. Then, the stepping motor lets the sensor plane return to the original position by its reverse rotation. This arrangement makes this temperature distribution measurement apparatus very useful.

The infrared array sensor of this invention has a construction comprising a substrate of pyroelectric crystalline or a ceramic body on which a multiple number of electrode pairs with one pair consisting of an electrode for receiving infrared rays and another electrode connected electrically to the former electrode and intended for a compensation purpose are laid out at certain distances in a linear pattern. Furthermore, opposing pairs of electrodes corresponding to the foregoing electrode pairs are mounted on the back side of the substrate and also leads for connecting between the opposing pairs of electrodes and the external electrical circuits. The electrode for receiving infrared rays has a window through which infrared rays reach the sensors and the electrodes for compensation are shut off from infrared rays.

The foregoing set-up of this invention makes it possible to measure a two dimensional incident infrared ray dose (thermal quantity) accurately without any disturbances inflicted on the outputs of the sensors by changes in the substrate temperature and by vibration.

The set-up of this invention has a chopping means to shield intermittently the incident infrared rays from the sensors. Every time the sensors are exposed to the incident infrared rays between the above shielded periods, the maximum output value of the sensors is measured by a peak hold circuit with a resultant contribution to enhanced measurement accuracy.

According to this invention, while the infrared rays incident upon the infrared sensors are shielded intermittently, the output signals of the infrared sensors are measured by sampling at a fixed periodic time for every time chopping takes place. From this sampled measurement value, the temperatures to be measured are obtained by calculation.

BRIEF DESCRIPTION OF THE DRAWINGS

FIG. 3 shows a block diagram involving the electrical signals of the foregoing apparatus.

FIGS. 4(a), 4(b), 4(c), and 4(d) illustrate waveforms and timing of the electrical signals of the foregoing apparatus.

FIGS. 7(a), 7(b), 7(c), 7(d), and 7(e) illustrate waveforms and timing of electrical signals of a practical embodiment of this invention.

FIGS. 26(a), 26(b), and 26(c) are a drawing to illustrate how signals are processed in the foregoing embodiment.

FIGS. 27(a), 27(b), and 27(c) are a drawing to illustrate how signals are processed in another embodiment of this invention.

FIGS. 30(a), 30(b), and 30(c) are a timing chart for electrical signals of the foregoing embodiment.

DESCRIPTION OF THE PREFERRED EMBODIMENTS

Example 1

Figure 1:
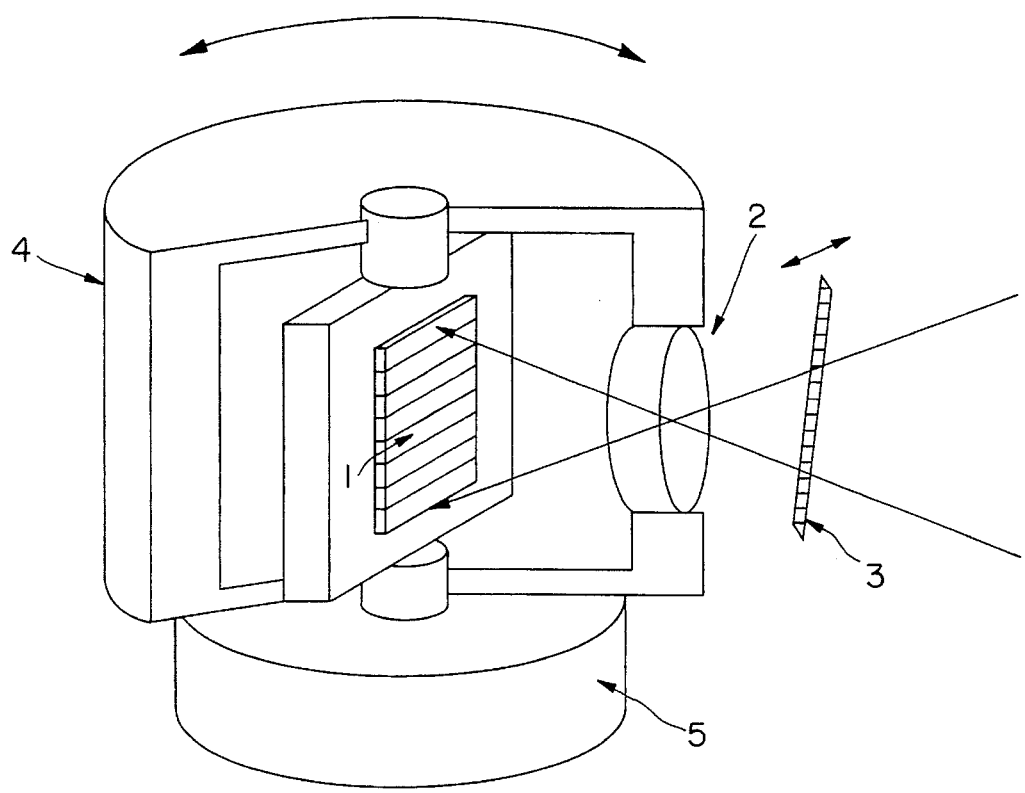
FIG. 1 is a partially cutaway perspective view to show the outline of a temperature distribution measurement apparatus as an embodiment of this invention.

FIG. 1 illustrates an exemplary embodiment of this invention. A rotating part 4 has a pyroelectric type infrared sensor array 1 wherein eight receiving elements are laid out vertically one after another. A silicone infrared lens 2 is positioned in front of the array sensor 1 to focus incident infrared rays on the pyroelectric sensor array. A chopper 3 in front of the lens 2 cuts off the incident infrared rays intermittently. The rotating part 4 is linked mechanically with a stepping motor 5.

Figure 2:
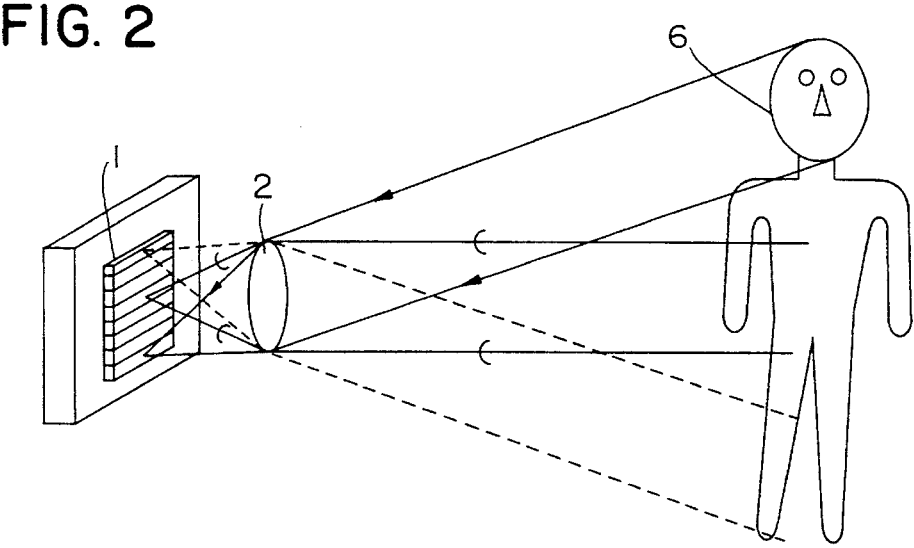
FIG. 2 is a perspective view to illustrate how infrared images are formed in connection with the foregoing apparatus.

FIG. 2 illustrates conceptually how infrared images are formed in the above set-up. Thermal radiations from a temperature radiating body like a human body 6 for example form an image on the array sensor 1 through the lens 2. Thus, the temperature distribution along the vertical axis of the human body is detected (though in a reversed order).

Now, the array sensor 1 is installed with its longer axis positioned vertically and the chopper is driven at 10 Hz. Then, the vertical dose distribution of the thermal radiations, namely, the vertical temperature distribution of the space facing the array sensor 1 and the lens 2 can be measured every 1/10 second. The ranges of the space that can be covered by the measurement are dependent on the viewing angle of the lens 2 and the sensor dimensions and the vertical space resolution is decided by the number of the infrared receiving electrodes as installed in the array sensor 1. For example, when the viewing angle of the lens 2 is 80 degrees and the array sensor 1 has 10 receiving electrodes, the vertical resolving power is 10 and each electrode takes care of 8 degrees in temperature measurement. Next, the stepping motor 5 is turned on and the rotating part 4 is rotated intermittently. Thus, by changing the direction of the array sensor 1 and the lens 2 right and left, and also by driving the chopper 3 in the same way as in the foregoing, a temperature distribution is measured. After this measurement, the temperature distribution in the respective directions is connected with each other and a reversed two-dimensional temperature distribution in the open space is obtained. The horizontal (right and left) resolution is dependent on the rotational angle per one step of the stepping motor 5. For example, when signals are inputted every 3.6 degree rotation and a rotation of 180 degrees in total is completed, the horizontal space resolution becomes 50. This makes it possible to measure the temperature distribution of an open space from the sensor position in a scope of 80 degrees vertically and 180 degrees horizontally with a resolving power of 10×50.

In connection with the type of array sensor, a pyroelectric sensor made from a inorganic compound like $pbTiO_3$ (for example) or an organic compound such as 13 vinylidene fluoride (for example) can be used. The kind of lenses is not limited to the one used with this example, either.

Example 2

FIG. 3 shows a block diagram relating to the electrical signals of the measurement apparatus. An I/O port 18 is electrically connected with a stepping motor driver 15, a chopper driver 13, a sensor signal processor 11 and CPU 14. The CPU 14 is further connected with a clock signal generator 16 and a data memory 17. FIG. 4 shows the timing of various electrical signals.

With reference to FIG. 3 and FIG. 4, signal processing is explained. When a signal from the clock signal generator 16 is received, an ON signal is sent to the stepping motor driver 15 with a resultant motor rotation of a certain fixed angle. At the same time, ON/OFF signals are sent to the chopper driver 13 resulting in appropriate opening and closing action. Thus, due to a synchronized performance between the stepping signal and the chopper signal, a sensing operation with proper timing can take place. In tune with the chopper's open or close state, the output of each sensor is as shown in FIGS. 4(*a*) through 4(*d*) and is stored in the data memory 17 after being processed through the sensor signal processor 11. The number of receiving electrodes of the sensor is defined as n and the data address is, for example, expressed as $S_{01}, S_{02}, ---, S_{0n}$. After the data is stored, the next stepping motor drive signals are outputted by the CPU 14. At this same moment, chopper ON/OFF drive signals are outputted and the measurement for the next direction is started. The data address after the measurement is expressed as $S_{11}, S_{12}, ---, S_{1n}$. In this way, measurements are taken with the direction changed m times and the data of the measurement is processed as a matrix as follows:

$$\begin{matrix} S_{01}, & S_{02}, & --, & S_{0n} \\ S_{11}, & S_{12}, & --, & S_{1n} \\ --, & --, & --, & -- \\ S_{m1}, & S_{m2}, & --, & S_{mn} \end{matrix}$$

Thus, the temperature distribution of the open space can be measured with a resolving power of n×m.

Example 3

Figure 5B:
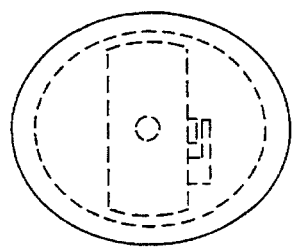
FIGS. 5(a), 5(b) and 5(c) are schematic illustrations of the foregoing embodiment of this invention.
Figure 5A:
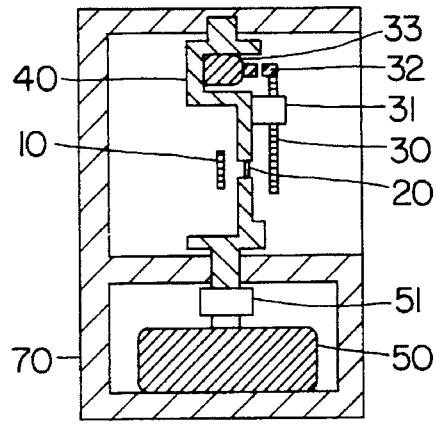
Figure 5C:
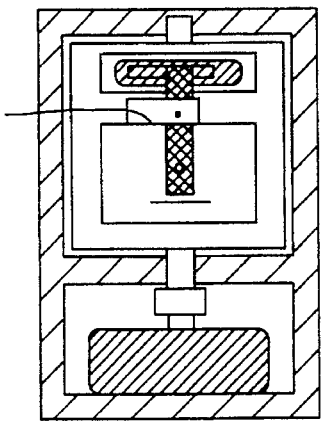

With the help of FIGS. 5(*a*), 5(*b*) and 5(*c*), another specific example of an embodiment of this invention is explained. A rotating part 40 has a pyroelectric type infrared array sensor 10 wherein a multiple number of receiving elements are laid out in a linear form and a silicone infrared lens 20 in front of the array sensor 10. Thus, the incident infrared rays are focused on the pyroelectric sensor array. Furthermore, a chopper 30 in front of the lens cuts off the incident infrared rays intermittently. By a partial rotation of the chopper 30 with a guide pin 31 serving as a fixed point, a chopping of the infrared rays entering into the lens 20 is made possible. A permanent magnet 32 is fixed on the chopper 30 and a miniature solenoid 33 drives the chopper into a motion as the electromagnetic field changes according to the electric current flowing into the solenoid. The rotating part 40 is linked mechanically through a connecting means with the Stepping motor 50.

In the schematic illustration, an item 70 is a mainframe of the sensor drive mechanism and supports the rotating part 40 firmly. As explained in the foregoing, the chopper is made in a lever like configuration and in a consolidated structure with the rotating part, thus making it possible to perform the required chopping function for each of the varying directions of sensing.

Example 4

Figure 6B:
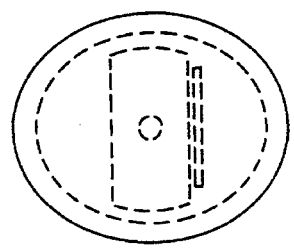
FIGS. 6(a), 6(b) and 6(c) are schematic illustrations of another embodiment of this invention.
Figure 6A:
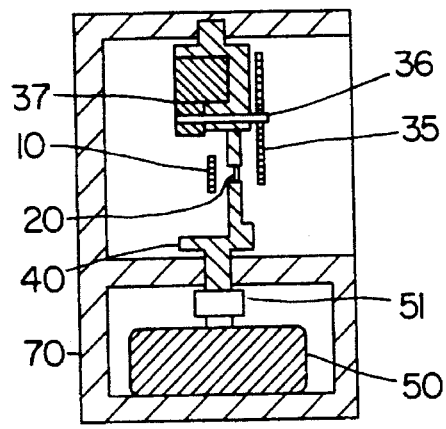
Figure 6C:
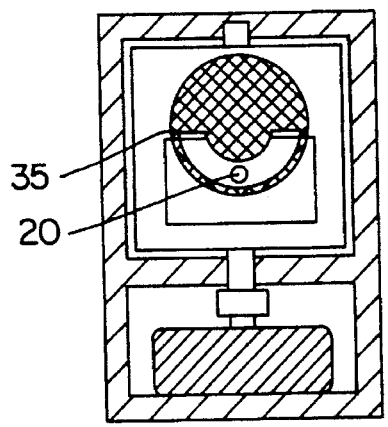

In the next, FIGS. 6(*a*), 6(*b*) and 6(*c*) show another mechanical construction. A rotating part 40 has a pyroelectric type infrared array sensor 10 wherein a multiple number of receiving elements are laid out and a silicone infrared lens in front of the array sensor 10. Thus, the incident infrared rays are focused on the pyroelectric array sensor 10. Further, a disc type chopper 35 in front of the lens 20 cuts off the incident infrared rays intermittently. The chopper 35 is rotated with a shaft 36 serving as a fixed point. By a hole made on a part of the disc type chopper 35, a chopping action is applied to the infrared rays entering into the lens 20. Item 37 is a miniature motor and the chopper 35 is rotated by this motor. The rotating part 40 is linked with a stepping motor 50 mechanically through a connecting means 51. Item 70 is a mainframe of the sensor drive mechanism and holds the rotating part 40 firmly.

Thus, by making the chopper 35 in a disc configuration and in a construction partially integrated with the rotating part 40, it is possible to perform the required chopping function for each of the varying directions of sensing.

As described in the foregoing, this invention makes it possible to measure a two-dimensional temperature distribution of an open space by having an array sensor of pyroelectric type and the like to detect infrared rays and a focusing means comprising an infrared lens to have the incident infrared rays focused on the array sensor and also a chopping means to cut off the incident infrared rays intermittently, integrated into a rotating part. Further, by having the rotating part rotated in the direction of the shorter axis of the array sensor, a temperature distribution of an open space corresponding to each rotating direction can be measured.

Example 5

Now, an explanation is given to an exemplary embodiment wherein a temperature distribution measurement apparatus of this invention is applied to a human body detecting system.

A measurement apparatus of the foregoing example is installed to the upper part of the walls of a room that measure about 6 meters by 6 meters to measure the temperature distribution of the whole room. The number of the receiving elements is chosen as 10 and the right and left rotational steps are set at 40. Then, the temperature distribution of the open space is expressed by a matrix of 10×40 as follows:

$$\begin{matrix} S00.01, & S00.02, & ----, & S00.10 \\ S01.01, & S01,02, & ----, & S01.10 \\ ---- & ---- & ---- & ---- \\ S40.01, & S40,02, & ----, & S40.10 \end{matrix}$$

Here, from the distribution data on the measured temperature of 35 degree C. and over, existence of persons in the room and their number are detected. It is difficult to tell one person located near the measurement apparatus from a multiple number of persons gathering at a far place by only on time measurement. However, it is not impossible to make a judgement from experience by looking at the changes of the measured temperature distribution against a lapse of time. In addition, a judgement on the magnitude of activities of the persons in the room can be made in a qualitative manner. Moreover, use of fuzzy theory and a membership function is effective in arriving at a judgment with a higher accuracy in the above judgment. It becomes possible to adjust the temperature control of an air conditioner according to the number of persons in an intended room by incorporating the foregoing human body detection system.

Additionally, in connection with the kind of infrared array sensor, pyroelectric sensors made of inorganic compounds like PbTiO$_3$ (for example) or organic compounds such as vinylidene fluoride (for example) are utilized. With regard to the kinds of the infrared lenses, the possibility of using other kinds of lenses than the one described in the examples of this invention is not excluded.

Example 6

In another exemplary embodiment of this invention, a stepping motor 5 is rotated in the reverse direction after finishing the measurement of the last plane direction and the apparatus is returned to the initial plane direction in the waiting state for the next round of measurement.

Figure 8:
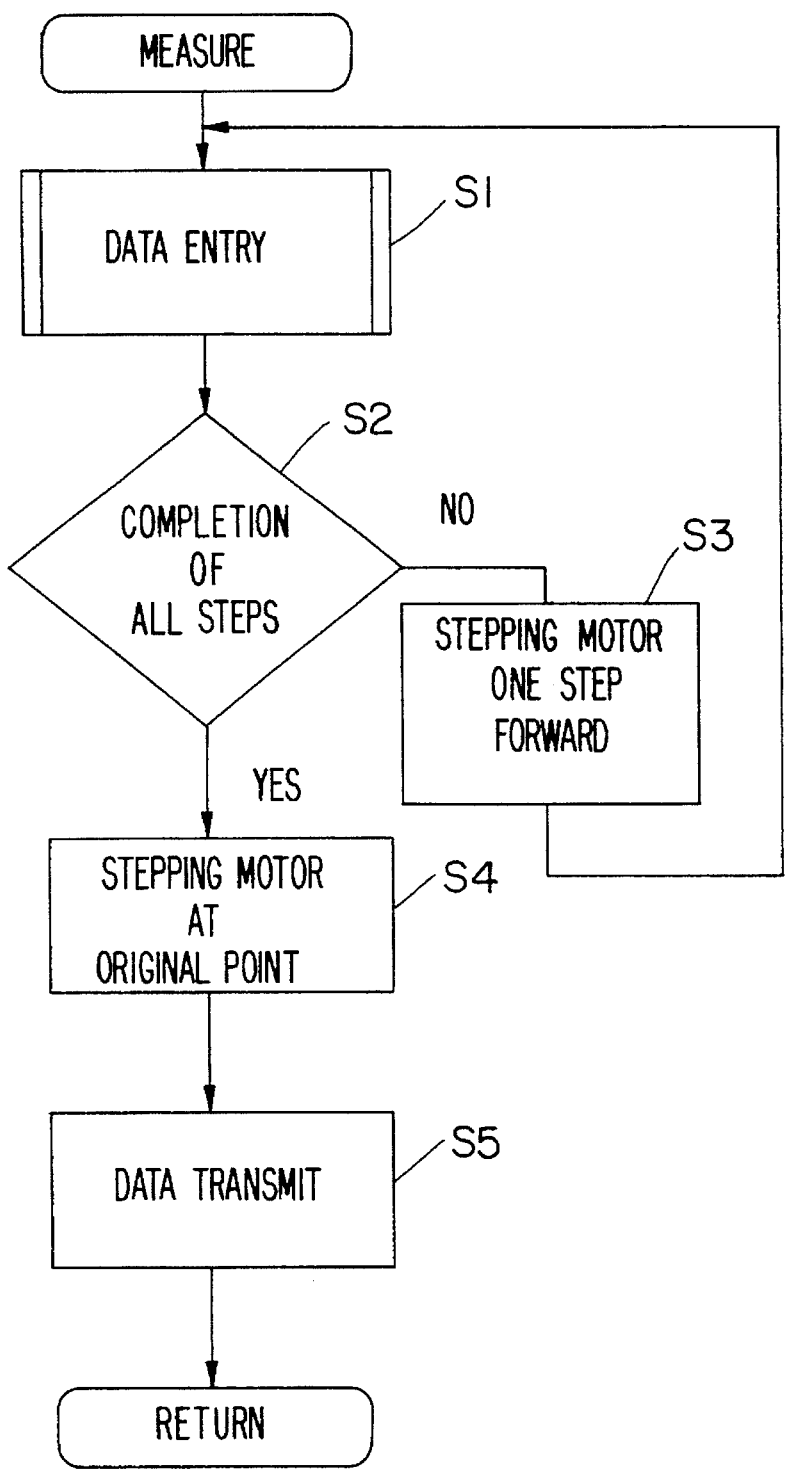
FIG. 8 is a flow chart to show operational processes of the above practical embodiment of this invention.
Figure 9:
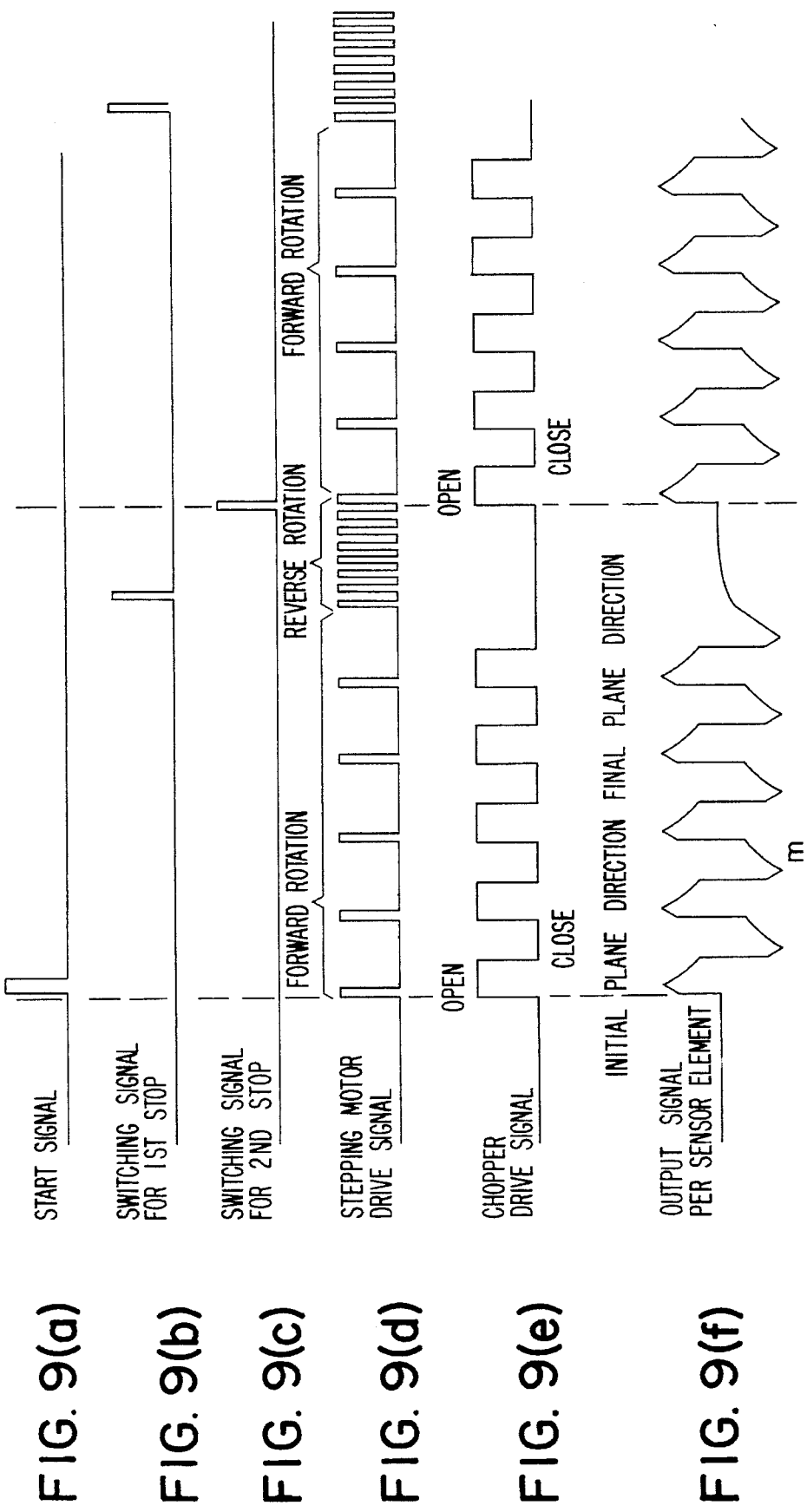
FIGS. 9(a), 9(b), 9(c), 9(d), 9(e), and 9(f) are another illustration of waveforms and timing of the foregoing practical embodiment of this invention.

FIGS. 7(a) through 7(e) show timing of principal electrical signal wave forms. FIG. 8 is a flow chart of the measurement methods.

With the help of FIGS. 7(a) through 7(e) and FIG. 8 signal processing is explained:

First, by the measurement start signal (a), a measurement of the initial plane direction is conducted. (Step S1) Next, with a signal received from the clock signal generator 16, the CPU 14 sets a stepping motor direction signal (b) to the forward direction (for example to HIGH) and when the stepping motor driver 15 is inputted with an ON signal of the stepping motor drive signal (c), the stepping motor 5 is rotated forward by a fixed angle (θ).

At this moment, the chopper driver 13 is also inputted with a chopper drive signal (d), ON or OFF signal, and the chopper 3 is either opened or closed. Here, as shown in the drawing, by having the stepping signal and the chopper signal synchronized, proper timing is made possible. The output from each sensor is illustrated in FIG. 7(e) in tune with the OPEN/CLOSE of the chopper 3. The output is then stored in the data memory 17 through the sensor signal processor 11. When the number of the sensor receiving elements is n, the data addresses are expressed, for example, as S01, S02, - - - , S0n. After the storage of the data, the next stepping motor drive signals are outputted by the CPU 14. At the same time, chopper drive signals of ON/OFF are outputted and measurement for the next direction is started. After the measurement, the data addresses are set forth as S11, S12, - - - , S1n. In this way measurements are repeated with the directions changed m times. When the measurement for the last direction (m'th measurement) is finished, the stepping motor drive signal is changed to the backward direction (LOW for example) by a signal from the CPU 14. The stepping motor 5 is then rotated in reverse at great speed by a total angle of m×θ degrees. (c) Now, the sensor plane is returned to the initial direction and the whole set-up of the measurement is kept at a waiting status. (Step S 4) The reverse rotation speed is made as high as possible. Next, the measurement data is fed into the CPU 14 (Step S 5) and processed in a matrix relation as set forth below to obtain the space temperature distribution with a resolving power of n×m.

$$\begin{array}{cccc} S01, & S02, & --, & S0n \\ S11, & S12, & --, & S1n \\ -- & -- & -- & -- \\ Sm1, & Sm2, & -- & Smn \end{array}$$

As a specific measurement example, the array sensor 1 is installed with its longer axis positioned vertically and the chopper 3 is driven at 10 Hz. Then, a vertical temperature distribution against one direction is measured every 1/10 second. The measurable scope of the open space is dependent on the viewing angle of the lens and the sensor dimensions and the resolving power of the space along the vertical direction is governed by the number of electrodes for infrared ray receiving as installed on the array sensor 1. For instance, when the viewing angle of the lens is 80 degrees and the array sensor has 10 receiving elements, the vertical resolving power is 10 and the temperature of an open space ranging over 8 degrees in angle is measured.

Now, a temperature distribution is measured at this time by scanning the space area facing the array sensor 1 and the lens 2 with the rotating part 4 rotating intermittently in the forward direction and the chopper 3 being driven in the same way as described in the foregoing. At the completion of the measurement, a series of the data on the vertical temperature distribution for one direction are put together by a signal processing to get a two-dimensional temperature distribution of the open space in a reversed form. The horizontal (right and left) space resolving power is dependent on the rotation angle per step of the stepping motor 5. For example, when signals are inputted, every rotational movement is 3.6 degrees and the total angle of rotation is 180 degrees, the horizontal space resolving power equals to 50 and an open space extending horizontally over 180 degrees and vertically over 80 degrees from the sensor position is covered with a resolving power of 10×50 at an interval of a few minutes in the measurement of the temperature distribution.

Example 7

Another exemplary embodiment of this invention is described wherein the stepping motor 5 is driven by a different driving method.

In the foregoing example, the number of rotations of the stepping motor 5 in its forward or backward rotation is set forth by the CPU 14. This can also be done by the use of stop switches that come into contact with the rotating part 4. In other words, at the moment the stepping motor 5 starts to rotate in the forward direction immediately after the completion of the measurement against the last plane direction, the rotating part comes into contact with the number 1 stop switch. The stepping motor 5 is then instantly rotated backward, e.g., reversely rotated by the signal outputted from the switch. This reverse rotation of the stepping motor comes to a stop when the rotating part 4 touches the number 2 stop switch that is installed at a position whereby the array sensor 1 faces the initial plane direction.

FIGS. 9(a) through 9(f) are a timing chart of the principal signal waveforms involved with the foregoing example.

When the number 1 stop switch is turned on (b), the stepping motor is rotated reversely. When the number 2 stop switch is turned on (c), the stepping motor is rotated forward. By this simple method, a temperature distribution of an open space is measured. Regarding other signals, the same explanation as in the example explained by FIGS. 4(a) through 4(d) applies here, too.

In addition, either the forwarded rotation or the backward (reverse) rotation only can be controlled by a stop switch.

Also, the chopper can be either stopped or continuously operated when the stepping motor is reversely rotated.

Example 8

Figure 10:
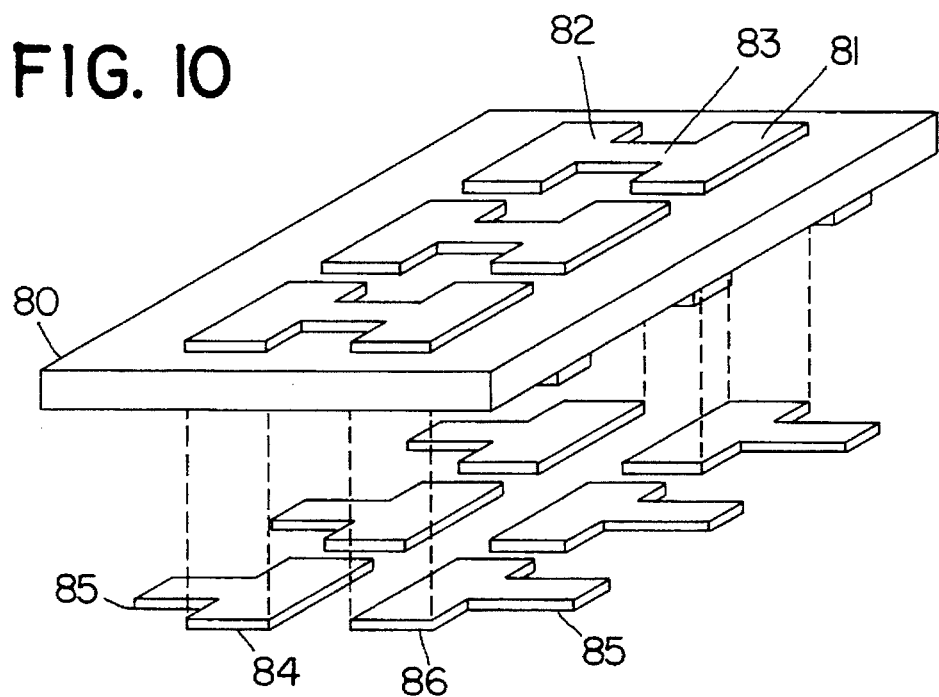
FIG. 10 is a schematic illustration of the pyroelectric body of a pyroelectric sensor as used in an embodiment of this invention.
Figure 11:
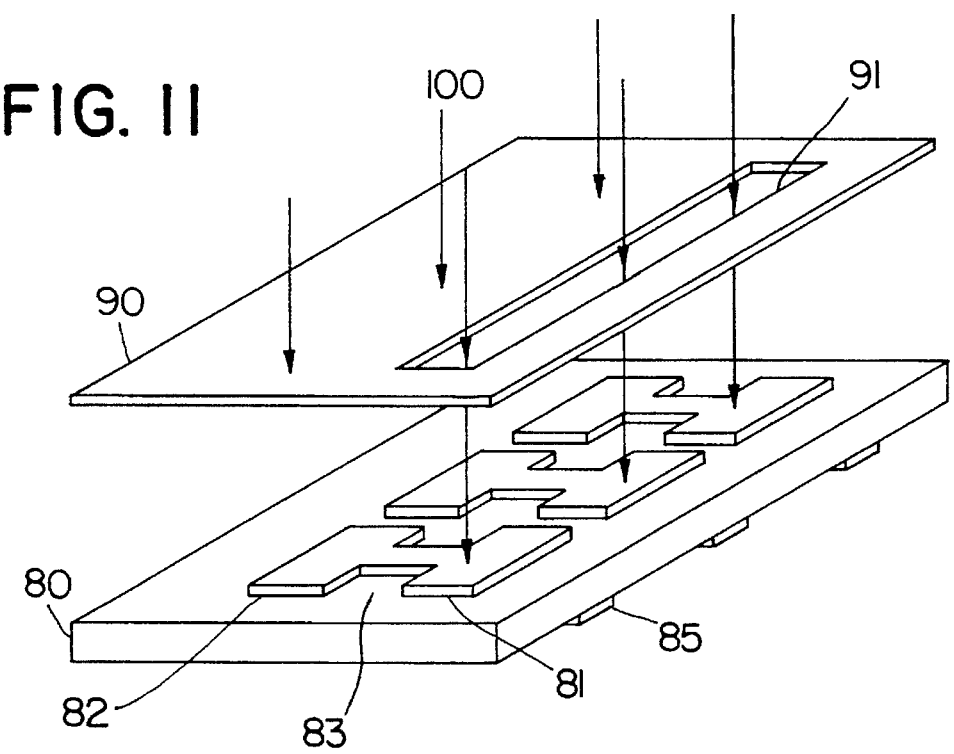
FIG. 11 is a schematic illustration to show a positional relation between the pyroelectric substrate and the selective infrared ray penetration substrate of the foregoing pyroelectric sensor.
Figure 12:
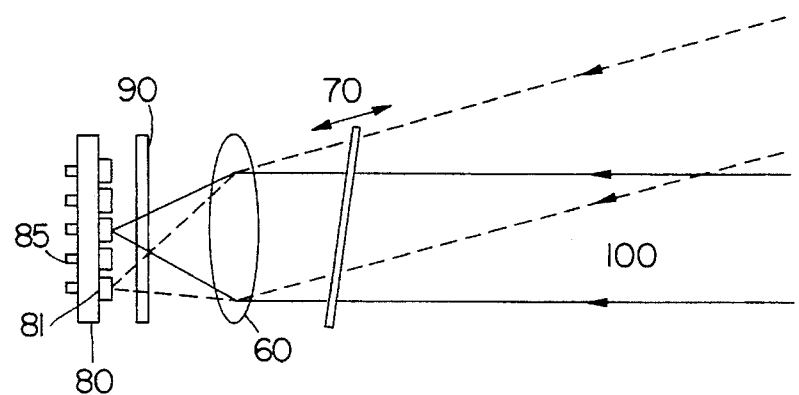
FIG. 12 is a concept drawing of a measurement apparatus comprising the foregoing pyroelectric sensor.

FIG. 10, FIG. 11 and FIG. 12 are schematic illustrations of pyroelectric bodies to explain exemplary embodiments of this invention. As shown in FIG. 10, a pyroelectric substrate 80 comprising PbTiO$_3$, etc. that are made into a thin plate form by cutting and polishing processes, has a multiple number of receiving electrode 81 and compensating electrode 82 over its front surface formed by an evaporation process or by a sputtering process. Each of the foregoing electrodes has a provision for electrical connection through a connecting part 83. Furthermore, on the back side of the pyroelectric substrate 80, there are opposing electrodes for receiving 83 and opposing electrodes 84 both formed by an evaporation process or by a sputtering process and at the positions opposite to those of the receiving electrodes 81 and the compensating electrodes 82 respectively. Also lead out electrodes 85 are formed by the same process as employed in forming other electrodes and are intended for acting as a connecting means to connect electrically to external electrical circuits. The electrode patterns can be formed either by a metal masking method or by a photolithograph method. In this processing, it is better to have the distance between adjacent electrodes of the receiving electrodes ranged from 10 to 200 μm and the distance between the receiving electrode 81 and the compensating electrode 82, e.g., the length of the electrode connecting part 83, ranged from 500 μm to 2 μm. Also, it is desirable to make the areas of the receiving electrode and the compensating electrode equal to each other. The width of the electrode connecting part and the lead out electrode is better with the one ranging from 20 to 100 μm.

Next, as shown in FIG. 11, a selective infrared ray penetrating substrate 90 with a selective infrared ray penetrating window 91 put in position in the foreground of the receiving plane of the pyroelectric substrate 80. By this arrangement, infrared rays 100 are incident only to the receiving electrode 81 and shielded off from the compensating electrode 82.

FIG. 12 shows the relative position of the pyroelectric substrate 80, the selective infrared ray penetrating substrate 90, an infrared ray lens 60 to have the incident infrared rays focused on the receiving electrode 81 and the chopper 70. Naturally, the infrared rays after focusing is not incident on the compensating electrode 82 due to the existence of the selective infrared ray penetrating substrate 90 but incident to the receiving electrode 81 only. An pyroelectric output is gained from the infrared rays 100 hitting the sensor intermittently by chopping of the rays performed by the chopper 70.

The above selective infrared penetrating substrate of 90 is desirably comprising a metal that has a shielding capability against electromagnetic waves. Additionally, the selective infrared ray penetrating window 91 can be covered by a thin plate of silicone. Also, it is better to have the selective infrared penetrating substrate 90 placed between the infrared ray lens 60 and the pyroelectric substrate 80 and, more specifically speaking, fixed at the position within a few millimeters above the pyroelectric substrate 80.

Figure 13:
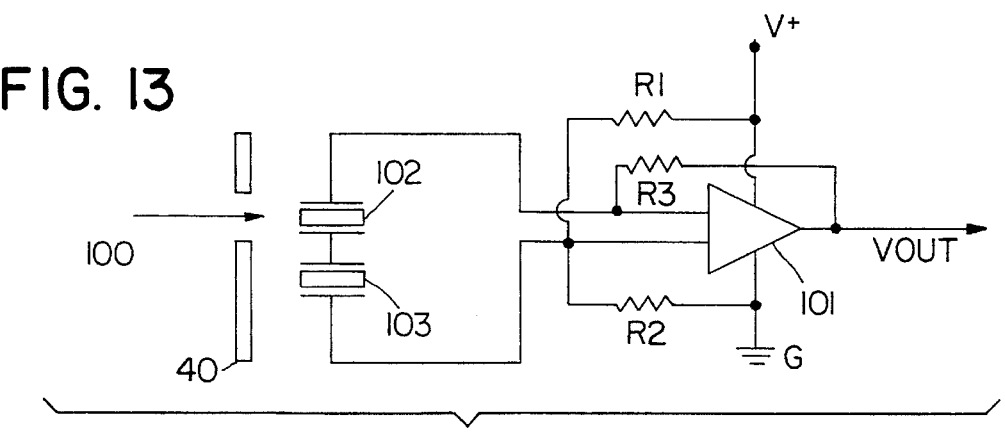
FIG. 13 shows an electrical circuit diagram of the foregoing measurement apparatus.

FIG. 13 is an equivalent circuit diagram of a receiving part, where R1, R2 and R3 are resistors and item 101 is an amplifier. A receiving element 102 is composed of the receiving electrode 81 and the opposing electrode for receiving 86, both of which are formed on the surfaces of the pyroelectric substrate 80. Likewise, a compensating element 103 is composed of the compensating electrode 82 and the opposing electrode for compensation 84, both being formed over the surfaces of the pyroelectric substrate 80.

In FIG. 13, when there is no compensating electrode of 103, the capacitance drift observed across the terminals of the receiving element is directly reflected to the output V out since the electric surface charges (pyroelectric output) generated in the pyroelectric substrate are, by the general nature of pyroelectric substance, fluctuated by temperature change, by vibration applied and by the kind of gas absorbed. Therefore, the detected output voltage is not likely to reflect accurately the energy changes of the incident infrared rays. However, by having the compensating electrode 103 in place, the adverse effects caused by the various factors as mentioned above are cancelled off between the two electrodes and the capacitance drift appearing across the output terminals is eliminated. Only when the infrared rays are incident to the receiving element 102, the surface charges are generated in the receiving element 102 and their changes are outputted and amplified as V out for detection.

Furthermore, the variance differs slightly by the ambient temperature. However, by monitoring the temperature of the pyroelectric body and feeding back the information, an accurate measurement of the infrared energy changes is made possible.

Actually, receiving electrodes and compensating electrodes are formed on a single pyroelectric substrate in a 10 element array and an infrared ray lens system having a viewing angle of 80 degrees are put together to build a measurement apparatus. Resultant accuracy of measurement shows ±0.2° C. and a space resolving power of 10 (8 degrees) in detecting a one-dimensional temperature distribution of an open space along the direction of the array.

In the next place, the pyroelectric substrate 80, the selective infrared penetrating substrate 90, the infrared penetrating lens 60 and the chopper 70 are put together to compose an integrated body of the rotating part which is then linked mechanically to the stepping motor. Then, while chopping is applied to the receiving electrodes along the direction of the array (in the direction of the longer axis), the stepping motor is driven to rotate the rotating part intermittently in the horizontal direction. Thus, the temperature distribution of an open space is measured by having the area facing the sensor and the lens scanned right and left. By connecting the vertical temperature distribution of each horizontal direction through the means of an electrical signal processing after the data taking, a two dimensional reverse temperature distribution of the open space is obtained. The horizontal (right and left) space resolving power is dependent on the rotating angle per step of the stepping motor. When a signal is inputted every 3.6 degrees of rotation and a total of 180 degrees is covered, for example, the horizontal space resolving power gained is 50.

Since the vertical space resolving power is 10 as mentioned in the foregoing, an open space with the extent of 80 degrees vertically and 180 degrees horizontally (from the sensor position) is covered in the temperature distribution measurement with an accuracy of ±0.2° C. and a space resolving power of 10×50.

Thus, as described in the foregoing, a two-dimensional temperature distribution measurement of an open space has been achieved by using the sensor of this invention. In addition, since the configuration of a receiving electrode is decided by the resolving power against the incident viewing angle, it is recommended for the foregoing case to make the ratio of the array direction (vertical) to the horizontal direction as 5:1.

Example 9

Figure 14:
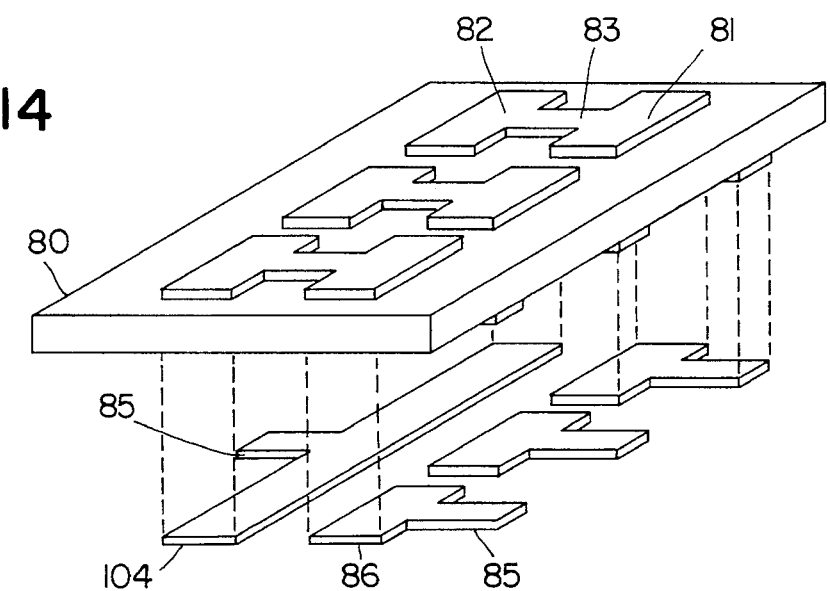
FIG. 14 is a schematic illustration of a pyroelectric body as used in another embodiment of this invention.

In connection with the configuration of the pyroelectric electrodes as described in Example 8, the opposing electrodes for compensation to be formed on the back side of the pyroelectric substrate are made into a single broad electrode called a common opposing electrode for compensation 104 as shown in FIG. 14.

In this arrangement, the common opposing electrode for compensation is desirably positioned so that it matches in position with all the compensating electrodes formed on the front side of the pyroelectric substrate.

By this arrangement, it is made possible for the opposing electrode for compensation to have only one lead out electrode 85 resulting in an extremely simplified electrical connection between the pyroelectric substrate and the external electric circuits.

Example 10

Figure 15A:
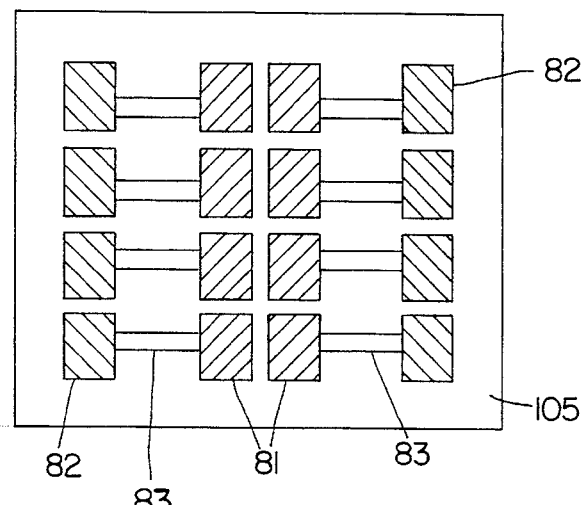
FIGS. 15(a) and 15(b) are schematic representations of a certain specific electrode patterns or a pyroelectric sensor.
Figure 15B:
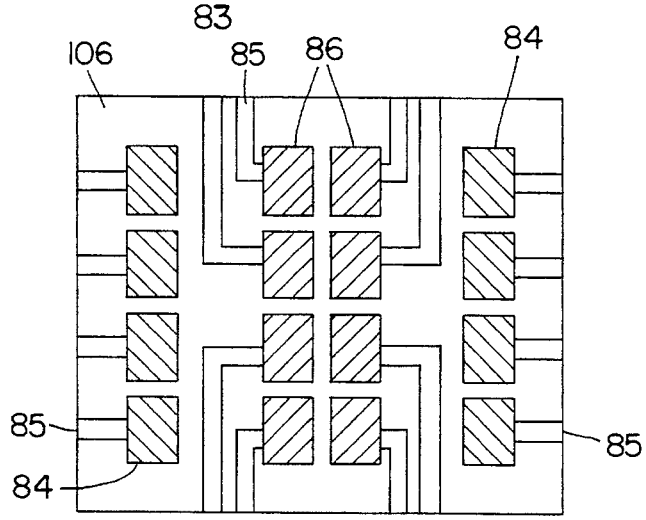

Another example of electrode patterns to be formed on the pyroelectric substrate is illustrated in FIGS. 15(*a*) and 15(*b*). As shown in FIGS. 15(*a*) and 15(*b*), receiving electrodes 81, electrode connecting parts 83 and compensating electrodes 82 are formed in two identical groups on the front side of a pyroelectric substrate 105. On the back side of a pyroelectric substrate 106, opposing electrodes for receiving 86 and opposing electrodes for compensation 84 are formed at the places corresponding to those of the receiving electrodes and compensating electrodes respectively. Item 85 is a lead out electrode to connect the various electrodes to the external circuits. The dimensions of all the electrodes are the same as in Example 8.

Actually, an arrangement of two lines of receiving electrodes and compensating electrodes formed on a single pyroelectric substrate in a 10 element array respectively with a masking plate installed above the pyroelectric substrate to pass the incident infrared rays only to the receiving electrodes, coupled with the use of an infrared ray lens system of 80 degree viewing angle has made it possible to measure the two-dimensional temperature distribution of an open space with an accuracy of ±0.2° C. and a space resolving power of 2×10.

Next, in the same way as in Example 8 the pyroelectric substrate, the selective infrared penetrating substrate, the infrared penetrating lens and the chopper are put together to compose an integral body of the rotating part which is then linked mechanically to the stepping motor. Then, while chopping is applied to the receiving electrodes vertically along the direction of the array (in the direction of the longer axis), the stepping motor is driven to rotate the rotating part intermittently in the horizontal direction. Thus, the temperature distribution of an open space is measured by having the area facing the sensor and the lens scanned right and left. By connecting the vertical temperature distribution of each horizontal direction through the means of an electrical signal processing after the data acquisition, a two dimensional reversed temperature distribution of the open space is obtained. The horizontal (right and left) space resolving power is dependent on the rotating angle per step of the stepping motor. When a signal is inputted every 3.6 degrees of rotation and a total of 180 degrees is covered for example, the horizontal space resolving power gained is 100. Since the vertical space resolving power is 10 as mentioned in the foregoing, an open space with an extent of 80 degrees vertically and 180 degrees horizontally from the sensor position is covered in the temperature distribution measurement with an accuracy of ±0.2° C. and a space resolving power of 10×100.

Thus, with the use of a sensor of this invention, it is possible to improve the resolving power 2 times in measuring the two-dimensional temperature distribution of an open space when compared with Example 8. Also, if the resolving power is kept constant, the scanning time required is reduced to one half.

Figure 16:
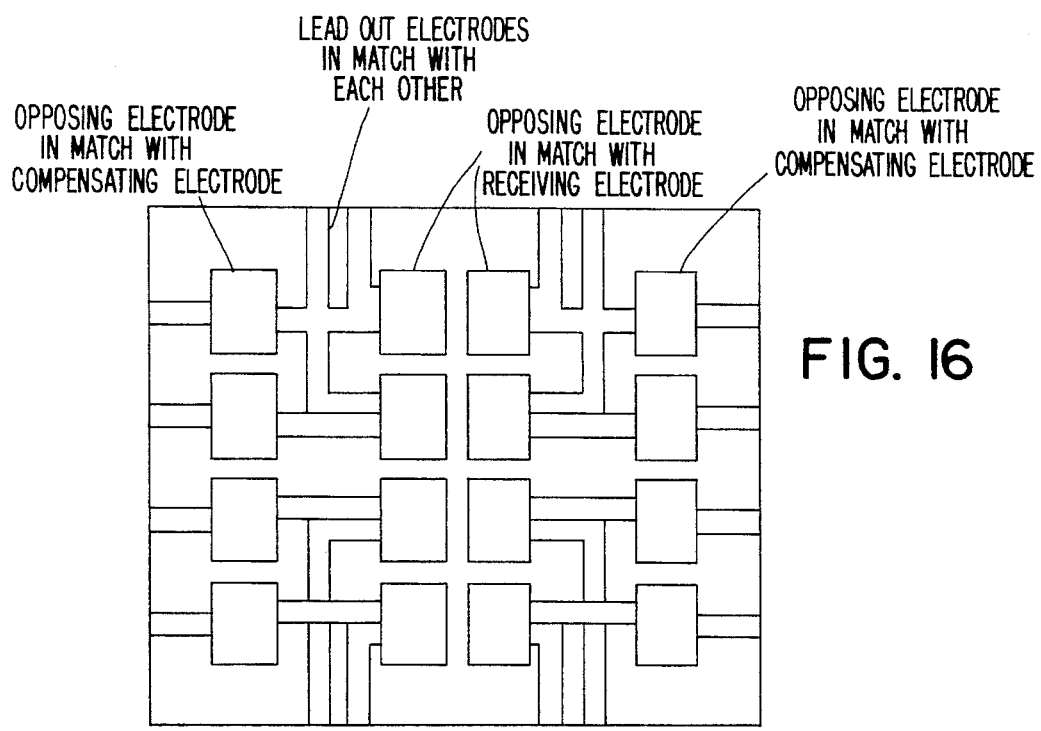
FIG. 16 is a schematic representation of a certain specific electrode pattern for a pyroelectric sensor.

How the receiving electrodes and the compensating electrodes are aligned in their positions with the opposing electrodes is illustrated in FIG. 16. On the other hand, the locations of lead out electrodes and electrode connecting parts are arranged not to align with each other as much as possible in order to avoid malfunctioning of the system.

Example 11

Figure 17A:
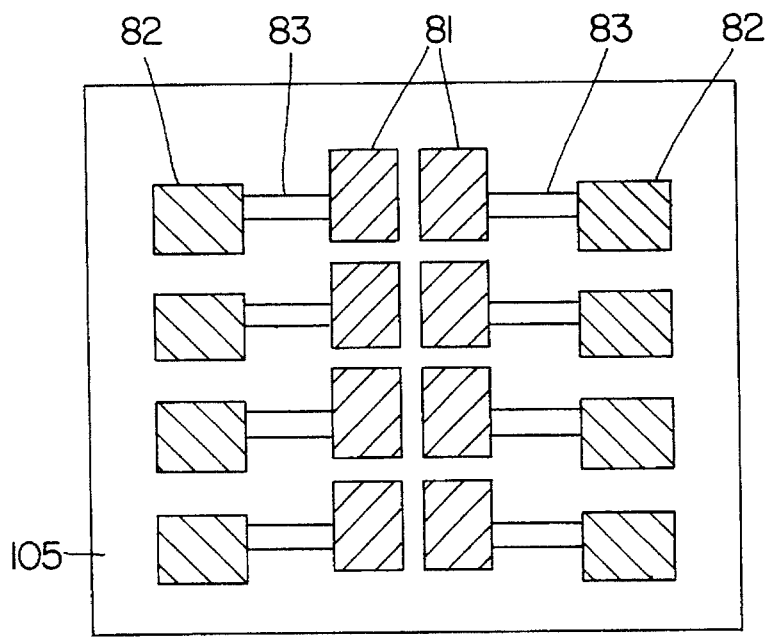
FIGS. 17(a) and 17(b) are schematic representations of a certain specific electrode patterns for a pyroelectric sensor.
Figure 17B:
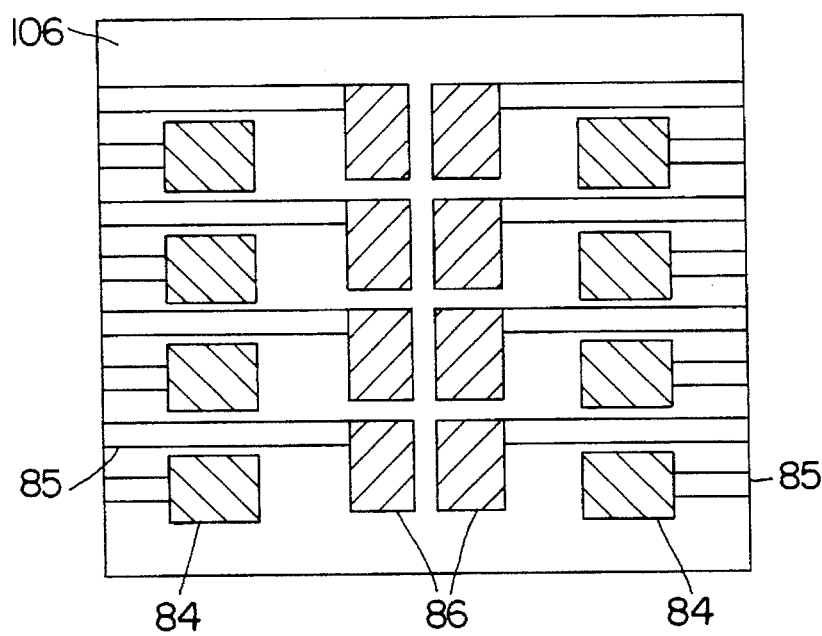
Figure 18A:
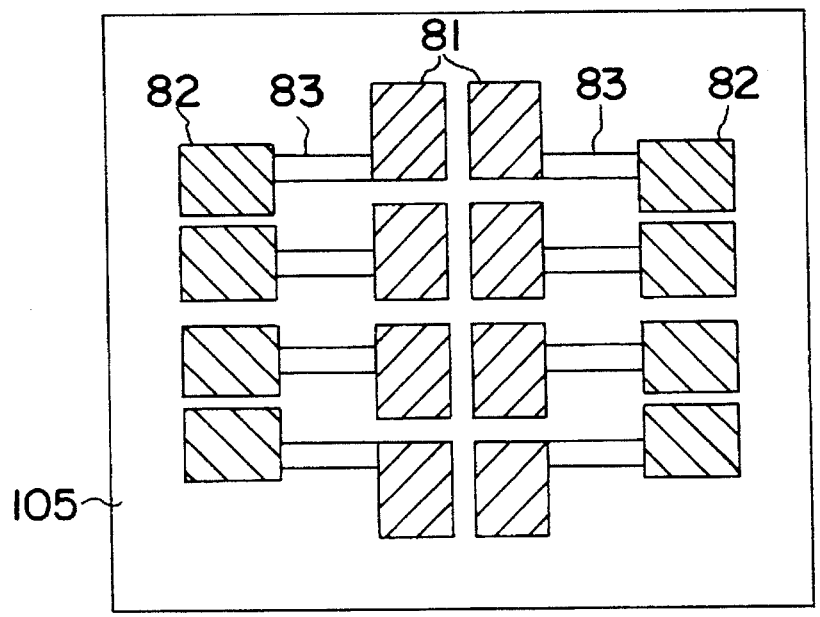
FIGS. 18(a) and 18(b) are schematic representations of a certain specific electrode patterns for a pyroelectric sensor.
Figure 18B:
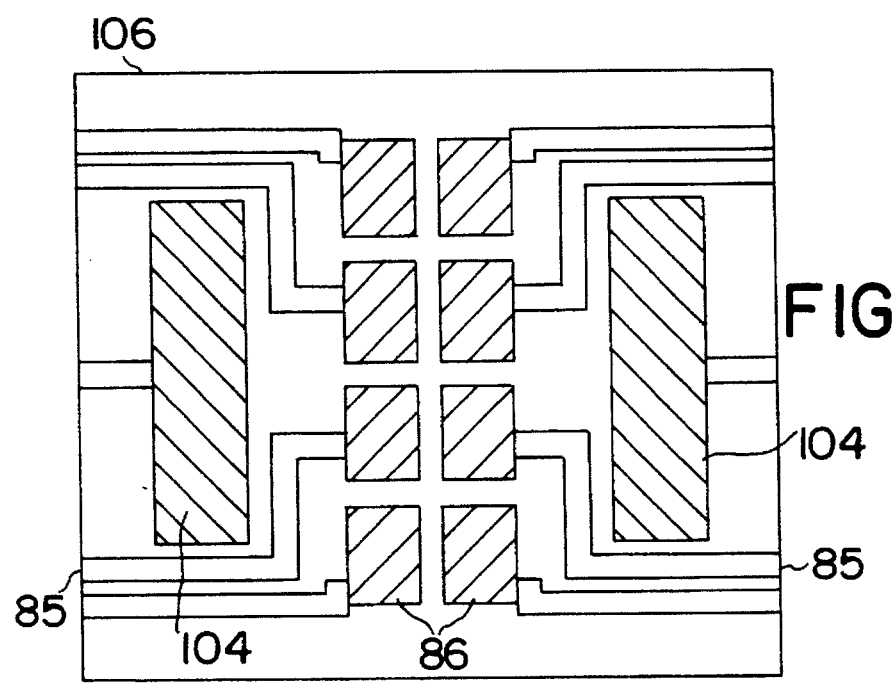

It is desirable to have the same patterns for both of the receiving electrodes and the compensating electrodes. However, depending on the case as shown in FIGS. 17(*a*) and 17(*b*), the patterns can be different from each other as long as the areas of the receiving electrodes and the compensating electrodes are kept the same with each other. By that way, it is easier to design the patterns of the lead out electrodes on the back side of the pyroelectric substrate 106 in particular by having the lead out electrodes extended out from both ends of the pyroelectric substrate. Also, in order to reduce the number of the lead out electrodes, the opposing electrodes for compensation to be formed on the back side of the pyroelectric substrate are combined into a single broad electrode of common opposing electrode for compensation 104 as illustrated in FIGS. 18(*a*) and 18(*b*). In this case, the common opposing electrode for compensation is designed to match in location with all the compensating electrodes 82 formed on the front side of the pyroelectric substrate. Thus, the number of the lead out electrode for the compensating electrode 85 is reduced to only two and the electrical connection between the pyroelectric substrate and the external electric circuits is simplified.

As described in the foregoing, the following effect is gained by the infrared ray detective array sensor of this invention:

(1) The density changes of the electric charges generated on the surface of a pyroelectric body are caused by temperature changes and vibrations applied to the pyroelectric body. The adverse effect of such changes is offset by the function of compensating electrodes through an electric circuit making it possible to measure accurately the dose of infrared rays (heat quantity) incident on the surface of receiving electrodes.

(2) By having the receiving elements laid out along two separate lines and also by having the lead out electrodes and the electrode connecting parts arranged in non-aligned relations with each other, it is possible to provide a sensor of two dimensional scanning that is capable of minimizing malfunctioning caused by temperature change and vibration.

Example 12

The performance of the temperature distribution measurement apparatus of this invention can be enhanced by using it together with various electric circuits.

Figure 19:
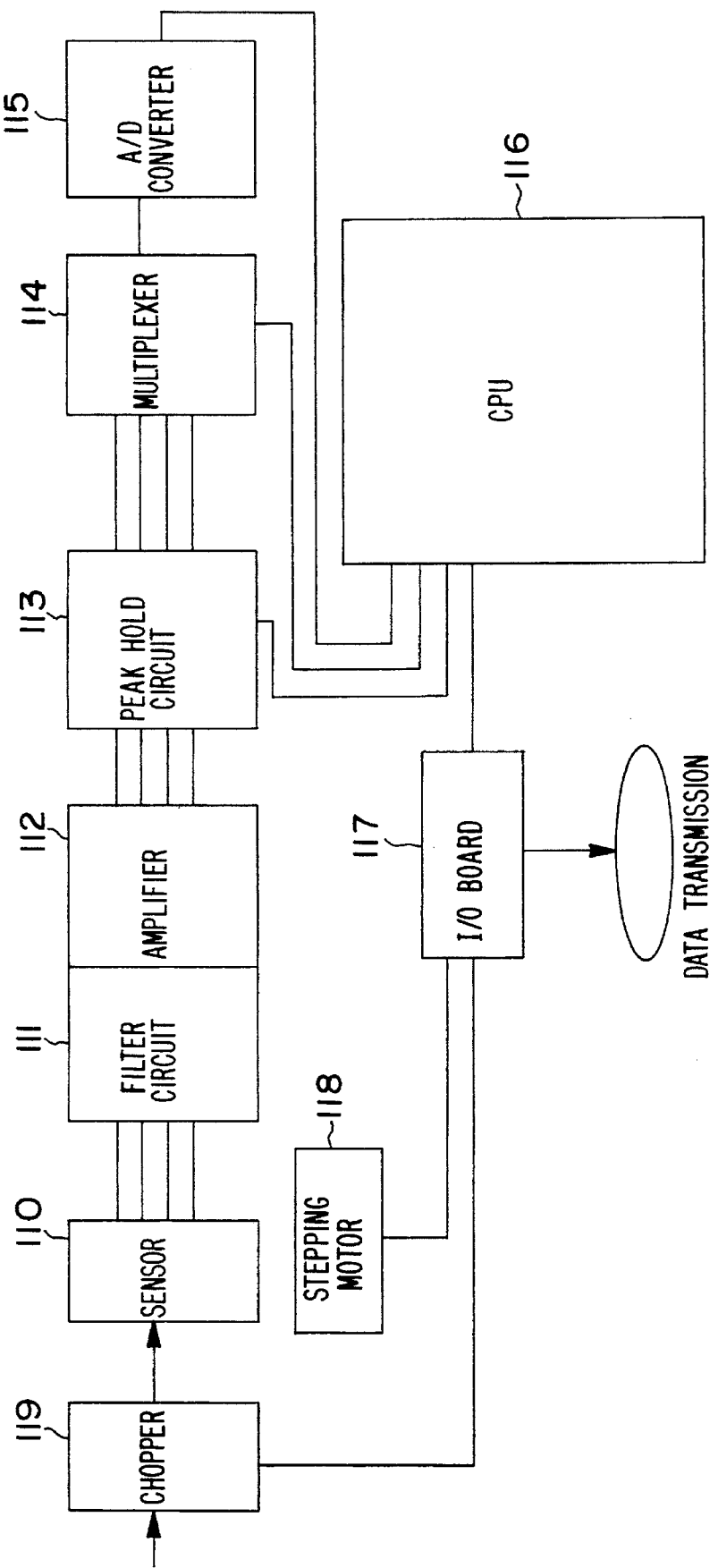
FIG. 19 is a block diagram to show measurement circuits of the foregoing apparatus.
Figure 20:
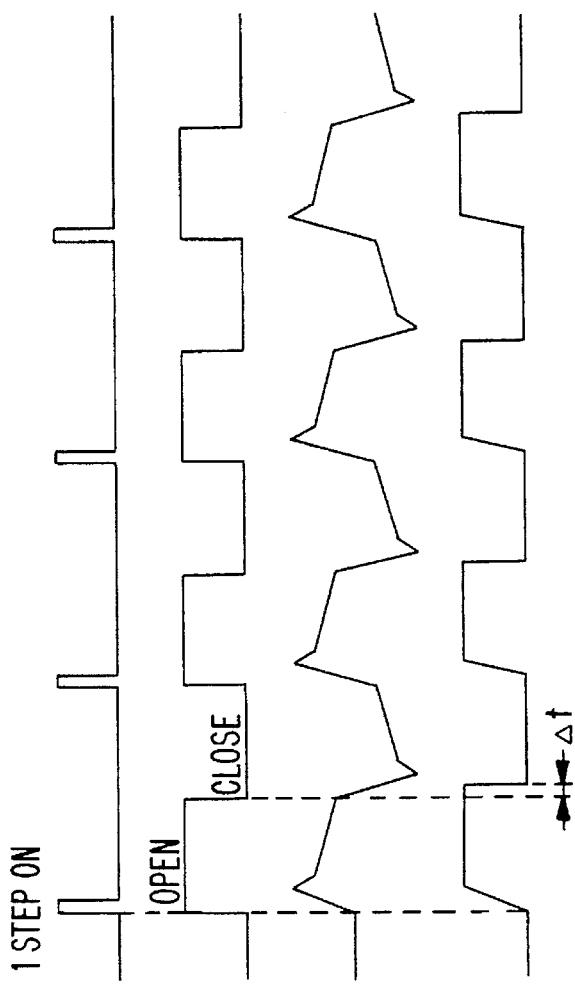
FIGS. 20(a), 20(b), 20(c), and 20(d) are a timing chart for the electrical signals of the foregoing apparatus.

A block diagram of the measurement circuits that are incorporating a peak hold circuit and making a part of the measurement apparatus of this invention is shown in FIG. 19.

The output signals from a sensor 110 comprising a multiple number of sensing elements are amplified by an amplifier 112 after being filtered in a filter circuit 111 for elimination of noises and then fed into a peak hold circuit 113 whereby peak values of the signals are kept in a hold respectively. These peak values correspond to the dose of incident infrared rays and consequently to the temperature of the object of temperature measurement. The maximum output value from each of the sensor elements is taken out selectively by a multiplexer 114 and converted by an A/D converter 115 and then stored as data in the memory of a CPU 116. The drive timing for a chopper 119 and a stepping motor 118 is controlled by the CPU 116 through an I/O board 117. The timing of the chopper 119, the stepping motor 118 and the peak hold is synchronized by a clock signal generator of the CPU.

The timing chart for the signals is shown in FIGS. 20(a) through 20(d), where 20(a) shows the stepping motor drive signal, 20(b) shows the status of infrared rays after chopping, 20(c) shows the analog waveforms outputted from the sensor and 20(d) shows the waveforms after the peak hold.

Figure 21:
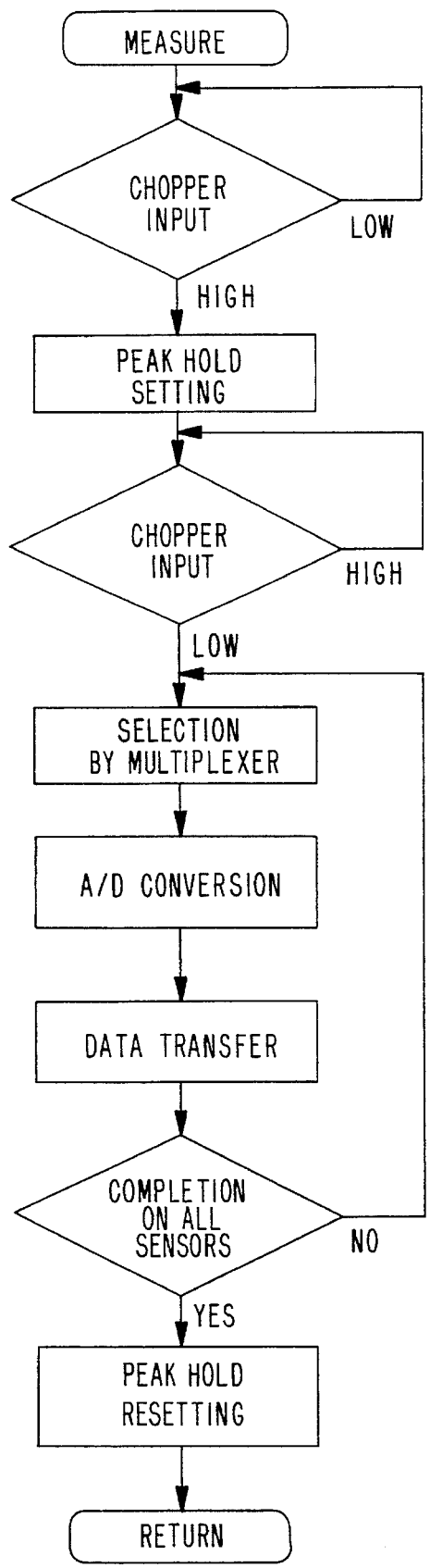
FIG. 21 is a flow chart for signal processing of the foregoing apparatus.

Now, the measurement procedures are explained with the help of a flow chart for signal processing as shown in FIG. 21. First, the chopper signal is turned HIGH and the chopper is open and the infrared rays are incident on the sensor. Then, the peak hold is turned on and the peak values from the sensor are kept on hold. When the chopper signal is turned LOW, the maximum values from the sensor elements are taken into by the multiplexer in succession, A/D converted and fed into the CPU. This process is repeated until all the elements are covered. Then, the peak hold is reset to a holding status. This resetting process is executed and completed during the initial period of chopper's closed status.

In the foregoing example, the case where a two-dimensional space temperature distribution is measured by changing the measurement directions by means of a rotational mechanism has been described. However, naturally, the methods are also applicable to the measurement of one-dimensional temperature distribution where there is no rotational mechanism involved.

Figure 22:
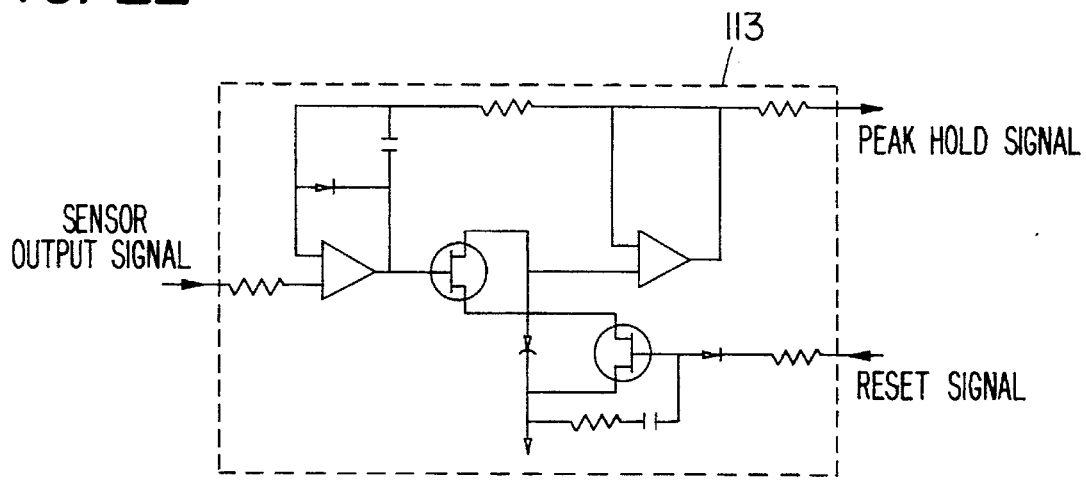
FIG. 22 is a schematic circuit diagram of a apeak hold circuit of the foregoing apparatus.

In FIG. 22, one example of the peak hold circuit 113 is shown. However, other circuits can be used.

In connection with a temperature distribution measurement apparatus that is provided with an array sensor for detecting infrared rays, and a chopping means for cutting off the infrared rays incident non the sensor intermittently as described in the foregoing, this invention is characterized by measuring the maximum value from each of the sensing element for every chopping moment while the value is kept in a peak hold circuit. This makes it possible to measure the temperature distribution (distribution of thermal radiation) of an open space easily with a simple measurement circuit.

Example 13

Figure 23:
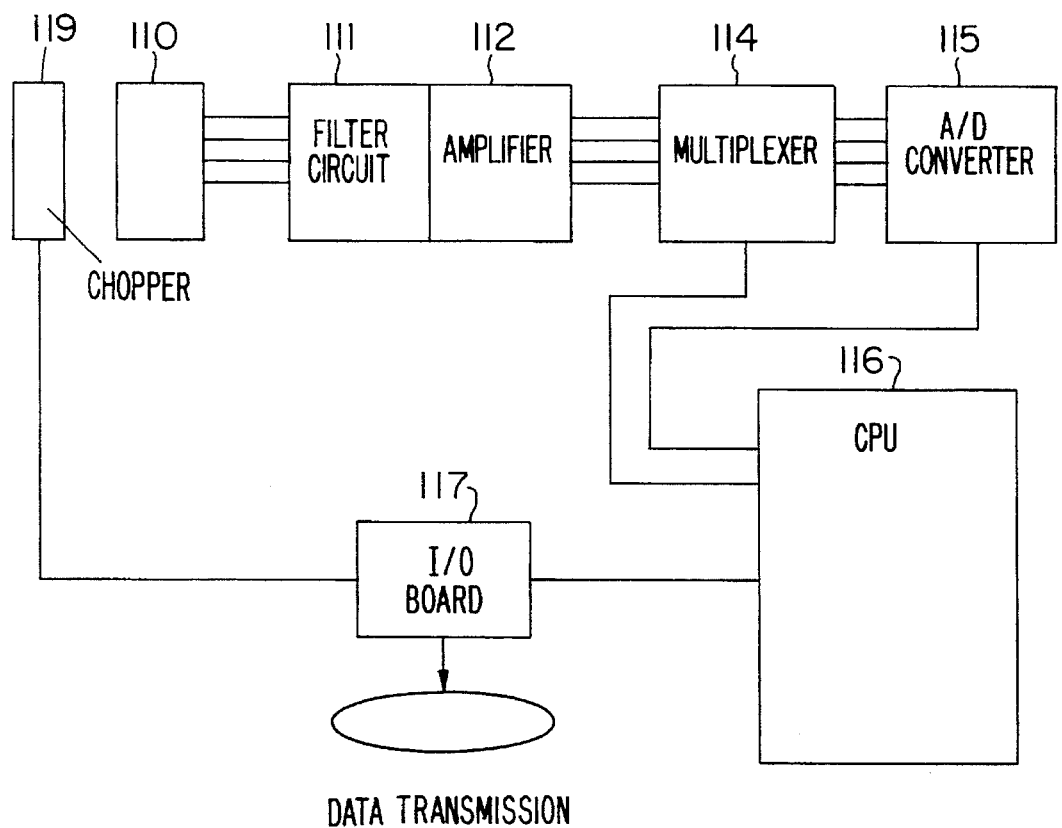
FIG. 23 is a block diagram of a temperature distribution measurement apparatus to show an embodiment of this invention.

A block diagram of the measurement circuit incorporating a peak hold function as used with the temperature distribution measurement apparatus of this invention is shown in FIG. 23. The output signals from a sensor 110 having a multiple number of elements are amplified by an amplifier 112 after the signals are fed into a filter circuit III for noise elimination. The amplified signal corresponding to each of the sensor elements is then inputted in succession to an A/D converter 115 through a multiplexer 114 whereby each sensor signal is fed to the A/D converter at a certain fixed sampling frequency. The resultant A/D converted digital signals are then inputted into a CPU 116 having a memory for storing data, a processor and a clock signal generator. The multiplexer 114 and a chopper 119 are driven by the CPU 116. Item 117 is an I/O board whereby the chopper 117 is controlled.

Figure 24:
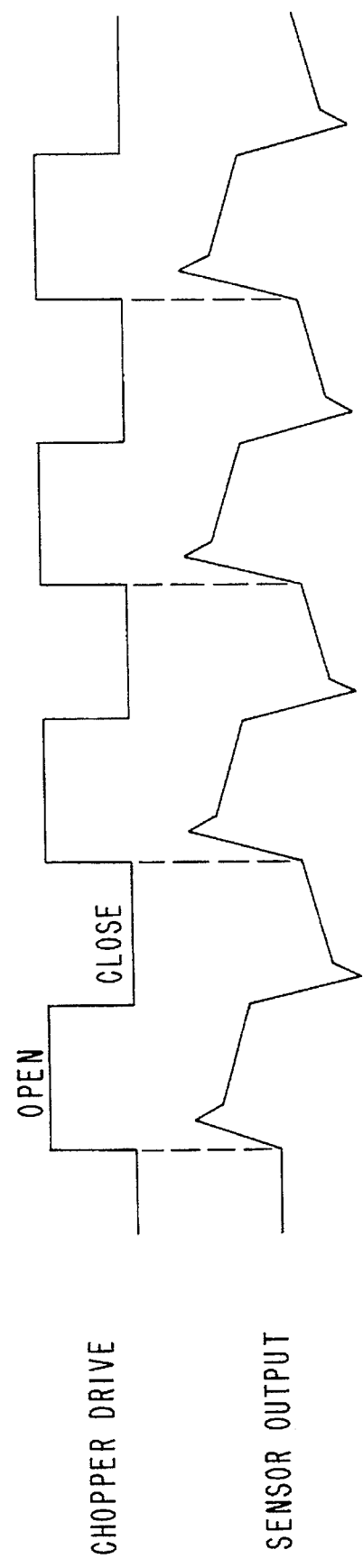
FIGS. 24(a) and 24(b) are a timing chart for electrical signals of the above embodiment.

A timing chart for the signals to drive the chopper 119 and the signal outputted from one sensor element is illustrated in FIGS. 24(a) and 24(b). As shown in this chart, the sensor output is changed according to chopper's open and close status.

In the next place, how the maximum values of the sensor element output are obtained by calculation is explained using FIG. 25 and FIGS. 26(a) through 26(c).

Figure 25:
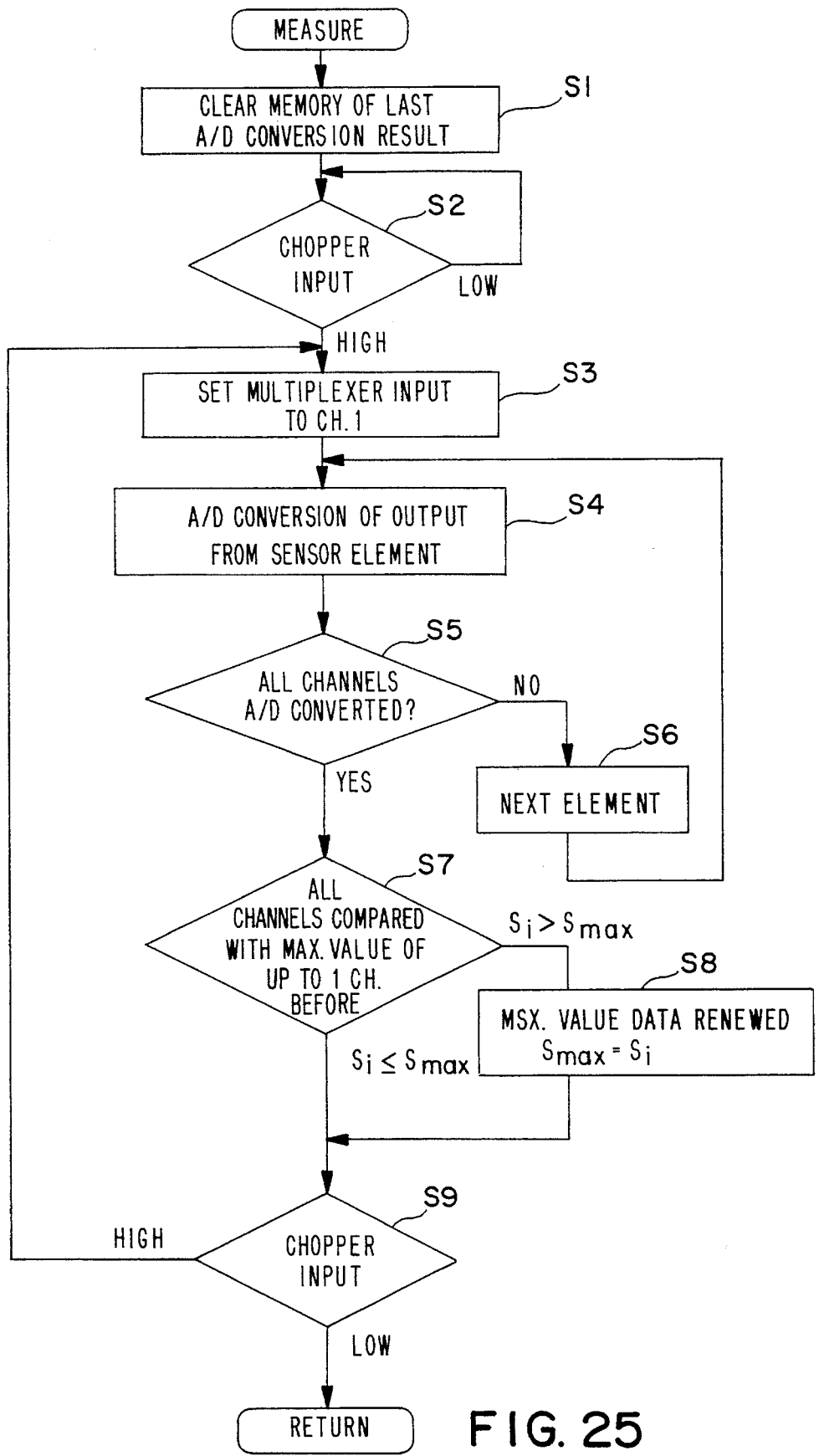
FIG. 25 is a flow chart for signal processing of the foregoing embodiment.

A flow chart of the signal processing involved with this invention is shown in FIG. 25 and an illustration to explain how the signals are processed during chopper's open period is shown in FIG. 26, where 26(a) is an analog signal waveform for the channel of activated sensor element, 26(b) is a digital output value after the A/D conversion of 26(a) and 26(c) is a variance of the maximum output values after a comparing treatment. Here, the maximum output values gained during chopper's open period correspond exactly to the amount of the incident infrared rays wherein the temperature of a measurement object is accurately reflected.

First, the memory data after the A/D conversion of all signals from the sensor elements (suppose there are channels from 1 to n) are cleared. (S1) Then, when the input voltage to the chopper 119 corresponding to the sensor input status is turned to HIGH (chopper's open status) (S2), signals of channel 1 through channel n are inputted in sequence at a given frequency according to the multiplexer 114 to the A/D converter for A/D conversion. (S3, S4, S5, S6) On each channel value, a comparison is made between one converted value (data Si for number "i"th channel for example) and the maximum value (Smax) among all the converted values up to one value before. (S7) When Si is larger than Smax, the maximum value is renewed as Smax equals to Si. (S8) Otherwise, the maximum value is not replaced by a new value. This comparing process is repeated while the chopper voltage remains at the HIGH status. (S9) Then, all the maximum values for all channels are obtained for one open period of the chopper.

The data processing time per one sensor element is about 100 usec. and the sampling frequency f equals 1 kHz for the element number of 10. (e.g. 10 channels) When the chopping frequency is 10 Hz at the time of measurement 50 times of chopping can be performed during the one open period of the chopper. Thus, by having a relationship established in advance between the temperature of a measurement object with a known temperature value and the maximum output values as derived according to the foregoing procedure the one-dimensional temperature distribution of an open space is accurately measured.

Example 14

Now, another exemplary embodiment of this invention is explained in the following:

In the foregoing Example 13, a case where the maximum values taken during the open state of the chopper is utilized as corresponding to the temperature of a measurement object is described. Besides this approach, it is possible to establish a close correlation between the temperature of a measurement object and the output values from the measurement set-up of this invention by utilizing an integral of the output values obtained during a certain limited time within the period when the chopper is at an open state.

A different method for obtaining by calculation the temperature to be measured by utilizing the A/D converted digital signals as outputted from a measurement system that is similar to that used in Example 13 is explained.

Figure 28:
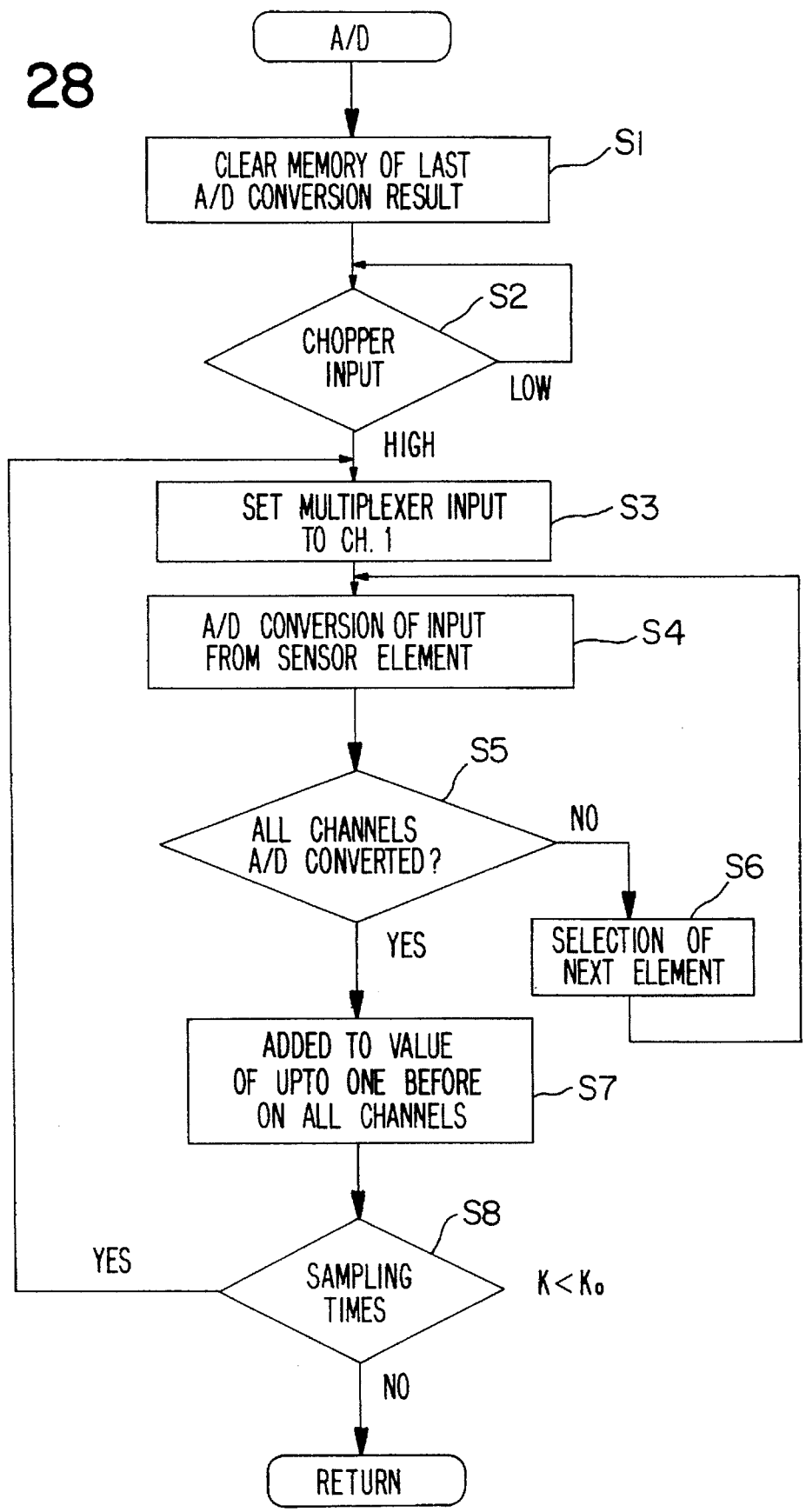
FIG. 28 is a flow chart for signal processing of the above embodiment.

How the signals are processed during chopper's open period is described in FIGS. 27(a), 27(b), and 27(c), where 27(a) is an analog waveform of signal outputted from a certain sensor element, 27(b) is the digital output after an A/D conversion of 27(a) and 27(c) is the output after an integral processing of 27(b) up to a certain period of time. A flow chart for this signal processing is shown in FIG. 28.

First, the memory data after an A/D conversion of the signals from all sensor elements (suppose there are channels from 1st to n'th) is cleared. (S1) Then, when the chopper voltage is turned to HIGH (chopper is open) corresponding to sensor's activated state (S2), the sensor outputs from the 1st channel to the n'th channel are inputted for an A/D conversion in sequence at a certain frequency according to the multiplexer 114. (S3, S4, S5, S6) On all channels, one output value after the conversion is (the i'th data of Si for example) added to the integral value integrated up to one value before and the resultant value of ($S_{total}$ equals to $S_{total}$ plus $S_i$) is obtained. (S7)

Next, the above process is repeated $K_O$ times which is the number of sampling times established in advance (e.g. setup time) (S8) and the value for each channel is taken for the period of chopper's one open state. By having the relation between the temperature of a measurement object with a known temperature and the integral value gained in the foregoing setup time established in advance, the one dimensional temperature distribution of an open space is accurately measured.

This example is characterized by showing its effect when the sensor output is together with many noises and while the method described in Example 13 tends to show the larger maximum values due to existence of noises, the method of this example is not affected by the noises of high frequency to any great extent.

In the foregoing example, after finishing the A/D conversion, the integral processing of the signals is performed before the next data is sampled. However, in this case, the sampling cycles may likely be extended. So, by having all the needed data collected within a given time and stored once in the memory and released for a calculation processing all at once, a higher speed sampling is made possible.

Example 15

Figure 29:
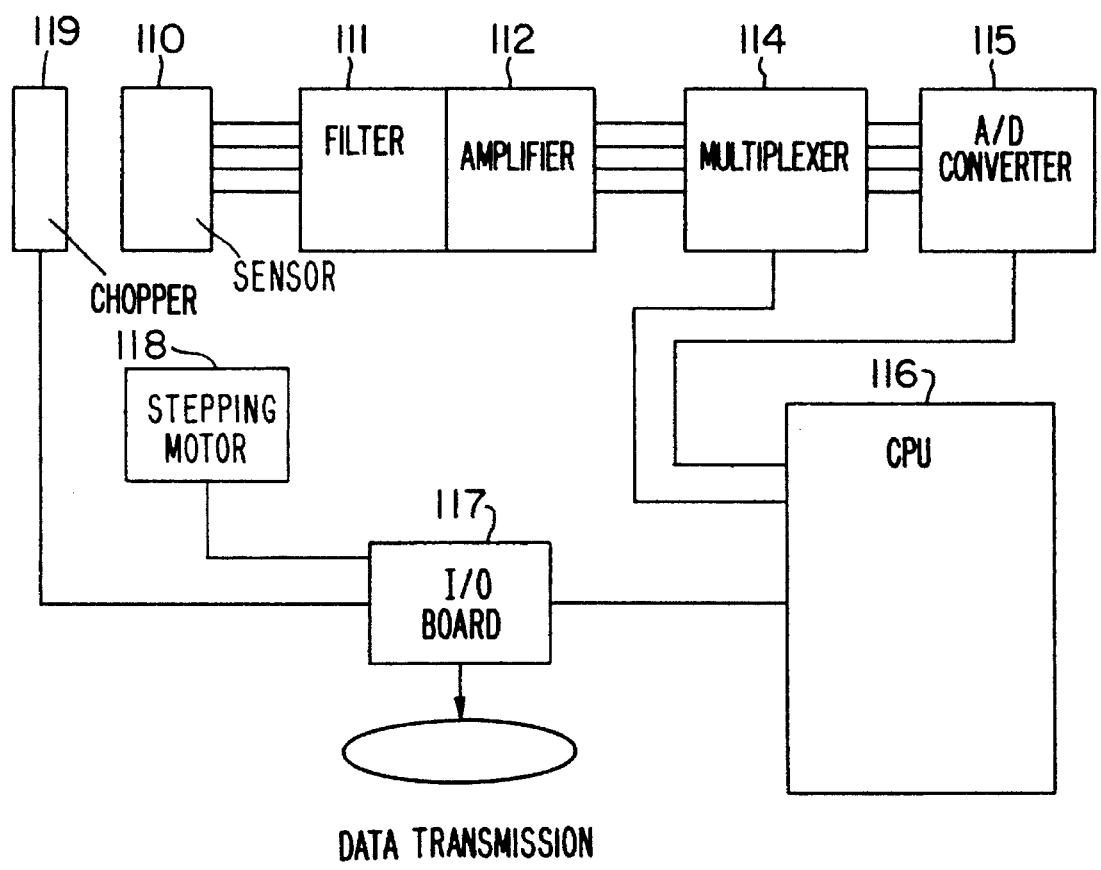
FIG. 29 is a block diagram to show measurement circuits of the foregoing embodiment.

A block diagram of measurement circuit is shown in FIG. 29. The output signals from a sensor 110 having a multiple number of sensor elements are amplified at an amplifier 112 after a filter 111 for noise elimination. The amplified signal corresponding to the output of each sensor element is then sampled in sequence at a certain sampling frequency by a multiplexer 114 and outputted to an A/D converter 115 for A/D conversion. Item 116 is a CPU which has a memory for storing data, a processor and a clock signal generator. Item 117 is an I/O board for controlling a chopper 119 and a stepping motor 118. A timing chart for the stepping motor drive signal, the chopper drive signal and the sensor output signal is shown in FIGS. 30(a), 30(b), and 30(c).

What is claimed is:

1. A temperature distribution measurement apparatus comprising:
   a) an infrared array sensor that includes a plurality of detector elements,
   b) focusing means that includes an infrared lens for focusing incident infrared rays on the infrared array sensor,
   c) chopping means for intermittently shielding the incident infrared rays from said plurality of detector elements, and
   d) rotating means for supporting and rotating together about an axis of rotation said infrared array sensor, said focusing means, and said chopping means, said axis of rotation intersects said plurality of detector elements.

2. A temperature distribution measurement apparatus comprising:
   a) an infrared array sensor that includes a plurality of detector elements,
   b) focusing means that includes an infrared lens for focusing incident infrared rays on the infrared array sensor,
   c) chopping means for intermittently shielding incident infrared rays from said plurality of detector elements, and
   d) rotating means for supporting and rotating together about an axis of rotation said infrared array sensor, said focusing means, and said chopping means, said rotating means rotates in synchronization with said chopping means, and
   said focusing means and said chopping means are positioned so that said incident infrared rays travel along a straight line between an object emitting said incident infrared rays and said focusing means.

3. The temperature distribution measurement apparatus of claim 2, wherein said plurality of infrared detector elements are formed adjacent to each other and adjacent to and parallel to said axis of rotation.

4. The temperature distribution measurement apparatus of claim 3, wherein said plurality of infrared detector elements are vertically stacked; and wherein said temperature distribution measurement apparatus further comprises:
   a) horizontal temperature measurement means for generating horizontal temperature distribution measurements by laterally rotating said rotating body rotating means;
   b) vertical temperature measurement means for generating vertical temperature distribution measurements by driving said chopping means; and
   c) two-dimensional temperature measurement means for generating spatial temperature distribution measurements by electrically combining said vertical and said horizontal temperature distribution measurements.

5. The temperature distribution measurement apparatus of claim 2, further comprising a stop switch for generating a switching signal to initiate a reverse rotation following a completion of forward rotation and wherein:
   a) said rotating means incrementally rotates said infrared array sensor;
   b) said chopping means shields a plurality of incident infrared rays from said plurality of detector elements at least one time for each angular increment; and
   c) said temperature distribution measurement apparatus further comprises a peak-holding circuit for obtaining a peak measurement output of each detector element while said detector elements are shielded from the plurality of incident infrared rays by said chopping means.

6. The temperature distribution measurement apparatus of claim 2, further comprising:
   a) computational means for determining number and position of persons in a space by measuring a temperature distribution in said space; and
   b) detector means for detecting movements of persons by analyzing changes in said temperature distribution of said space with respect to time.

7. The temperature distribution measurement apparatus of claim 6 further comprising an estimator means for estimating number and position of persons in said space using a membership function based on fuzzy theory.

8. An infrared array sensor comprising:

a pyroelectric infrared array sensor comprising:

(a) a pyroelectric substrate, (b) a multiple number of electrode pairs formed on the front side of said substrate at a certain distance in an array with a pair of said multiple number of electrode pairs including a first electrode for receiving infrared rays and a second electrode for compensation, said first electrode and said second electrode being connected electrically with each other through an electrode connecting part, (c) a multiple number of opposing electrode pairs formed on the back side of said substrate at the positions corresponding to those of said electrode pairs of the front side of the substrate, each opposing electrode of said multiple number of opposing electrode pairs corresponding to said electrodes for compensation are coupled to each other to form a single common electrode, lead out electrodes formed on the back side of said substrate which connect the multiple number of opposing electrodes to external electrical circuits, and a masking plate to shield the incident infrared rays off the electrodes for compensation while letting the infrared rays hit the receiving electrodes.

9. The infrared array sensor of claim 8, wherein said pyroelectric array sensor further includes two rows of said multiple number of electrode pairs formed in an array pattern, and said opposing electrode pairs formed on the back side of said substrate on positions other than those corresponding to said electrode connecting parts formed on the front side of said substrate.

10. The infrared array sensor of claim 8, wherein said plurality of opposing electrode pairs formed on the back side of said substrate comprise:

a) a plurality of opposing electrodes at positions corresponding to those of said electrodes for receiving infrared rays, and b) a broad electrode formed as the common opposing electrode to positions corresponding to those of said electrodes for compensation.

* * * * *